United States Patent [19]
Fujita

[11] Patent Number: 5,933,570
[45] Date of Patent: Aug. 3, 1999

[54] DATA RECORDING AND/OR REPRODUCING SYSTEM

[75] Inventor: Hiroyuki Fujita, Kanagawa, Japan

[73] Assignee: Sony Corporation, Tokyo, Japan

[21] Appl. No.: 08/831,567

[22] Filed: Apr. 9, 1997

Related U.S. Application Data

[30] Foreign Application Priority Data

Apr. 11, 1996 [JP] Japan ................................ 8-089290

[51] Int. Cl.$^6$ .................................................. H04N 5/76
[52] U.S. Cl. ................................ 386/96; 386/95; 386/105
[58] Field of Search ............................ 386/46, 96, 105, 386/106, 104, 125, 52, 95; H04N 5/76

[56] References Cited

U.S. PATENT DOCUMENTS

| | | | |
|---|---|---|---|
| 5,388,009 | 2/1995 | Nagai et al. ................................ | 386/95 |
| 5,392,265 | 2/1995 | Takazawa ................................... | 369/32 |
| 5,568,639 | 10/1996 | Wilcox et al. ............................ | 395/600 |
| 5,619,338 | 4/1997 | Nakai et al. .............................. | 386/126 |
| 5,627,656 | 5/1997 | Sonohara et al. ........................ | 386/96 |

*Primary Examiner*—Huy Nguyen
*Attorney, Agent, or Firm*—Frommer Lawrence & Haug, LLP.; William S. Frommer; Dennis M. Smid

[57] ABSTRACT

A method and apparatus for recording and/or reproducing data for recording and/or reproducing speech or audio data or video data to or from a random-accessible recording medium, in which speech data can be recorded and/or reproduced separately from video data in a virtual data file and in which the number of channels of speech data can be modified while speech data with different numbers of channels are allowed to co-exist in a virtual data file. A video data storage device and a speech data storage device, both being random-accessible, are separately provided for recording/reproducing video data and speech data. A data file for video and a data file for speech, each being divided in plural blocks and recorded by these data storage devices, are managed by a CPU using a file entry, a video data record entry and a speech data record entry stored in a RAM or a file management information storage unit. A control flag including the deletion possibility indicating flag is appended to the video data record entry and to the speech data record entry.

11 Claims, 32 Drawing Sheets

FILE ENTRY

RECORD ENTRY

FREE SPACE LIST

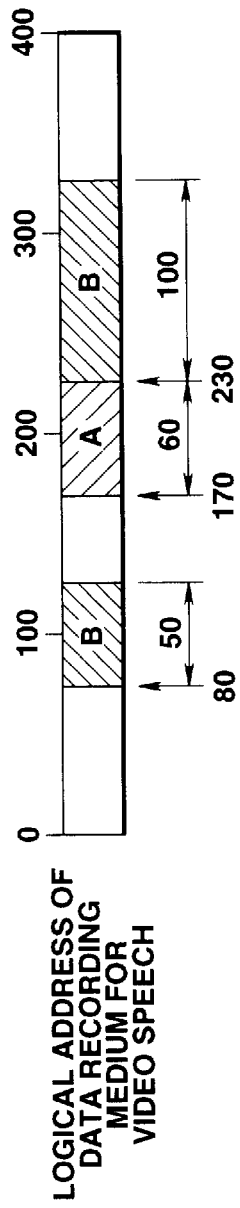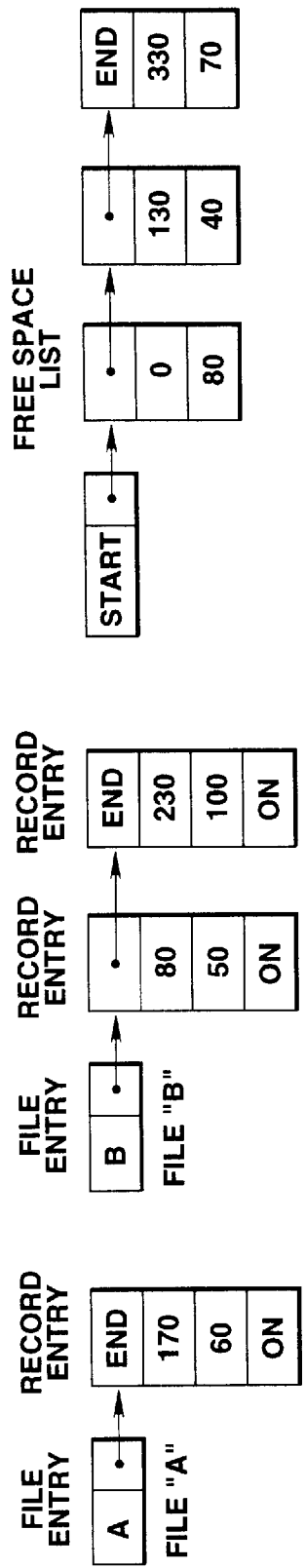

| FILE NAME 1 | PLAY BACK START POSITION | PLAY BACK END POSITION |
|---|---|---|
| FILE NAME 2 | PLAY BACK START POSITION | PLAY BACK END POSITION |
| FILE NAME 3 | PLAY BACK START POSITION | PLAY BACK END POSITION |
| ⋮ | ⋮ | ⋮ |

FIG.8

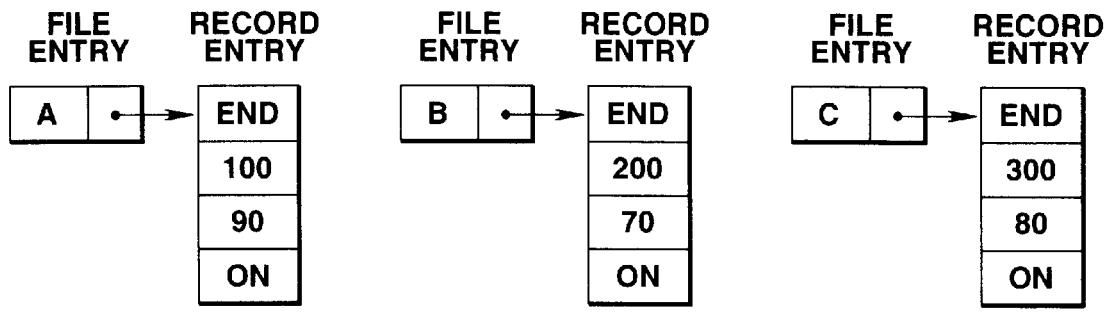
FIG.10(A)
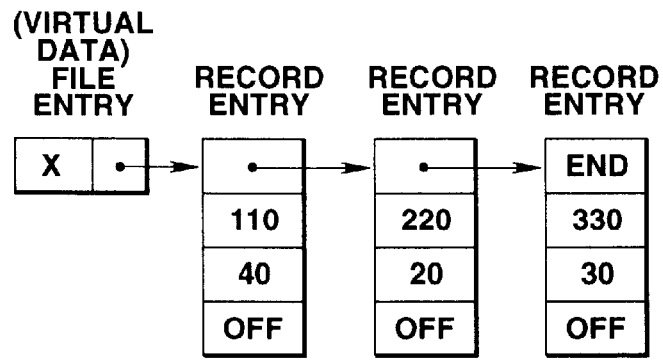
FIG.10(B)
FIG.10(C)

| FILE NAME 1 | PLAY BACK START POSITION | PLAY BACK END POSITION |
|---|---|---|
| FILE(1) | START(1) | END(1) |
| FILE(2) | START(2) | END(2) |
| ⋮ | ⋮ | ⋮ |
| FILE(n) | START(n) | END(n) |
| ⋮ | ⋮ | ⋮ |
| FILE(N) | START(N) | END(N) |

FILE ENTRY

| FILE NAME |
|---|
| FIRST VIDEO RECORD ENTRY LINK |
| FIRST SPEECH RECORD ENTRY LINK |
| FIRST SPEECH RECORD ENTRY LINK |
| FIRST SPEECH RECORD ENTRY LINK |
| FIRST SPEECH RECORD ENTRY LINK |

FIG.16(B)

VIDEO RECORD ENTRY

| NEXT VIDEO RECORD ENTRY LINK |
|---|
| LEADING POSITION DATA |
| RECORDING LENGTH DATA |
| CONTROL FIAG |

FIG.16(C)

SPEECH RECORD ENTRY

| NEXT SPEECH RECORD ENTRY LINK |
|---|
| LEADING POSITION DATA |
| RECORDING LENGTH DATA |
| CONTROL FIAG |

FIG.16(D)

FREE SPACE LIST FOR VIDEO

| NEXT FREE SPACE LINK FOR VIDEO |
|---|
| LEADING POSITION DATA |
| RECORDING LENGTH DATA |

FIG.16(E)

FREE SPACE LIST FOR SPEECH

| NEXT FREE SPACE LINK FOR SPEECH |
|---|
| LEADING POSITION DATA |
| RECORDING LENGTH DATA |

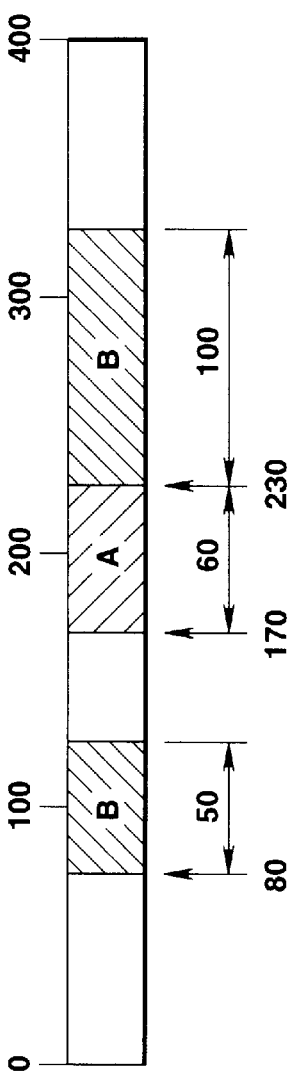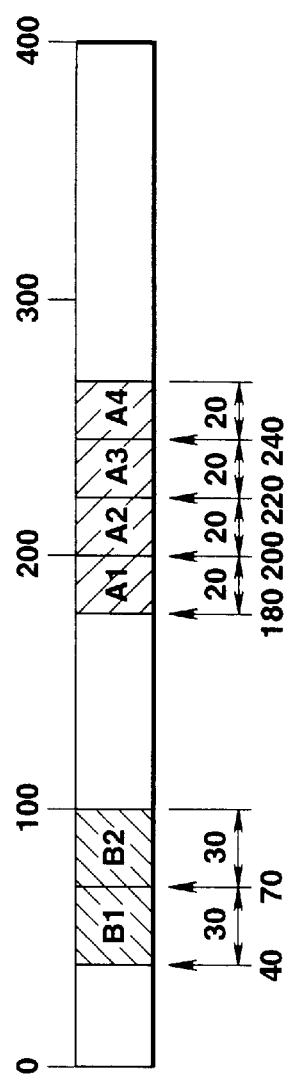

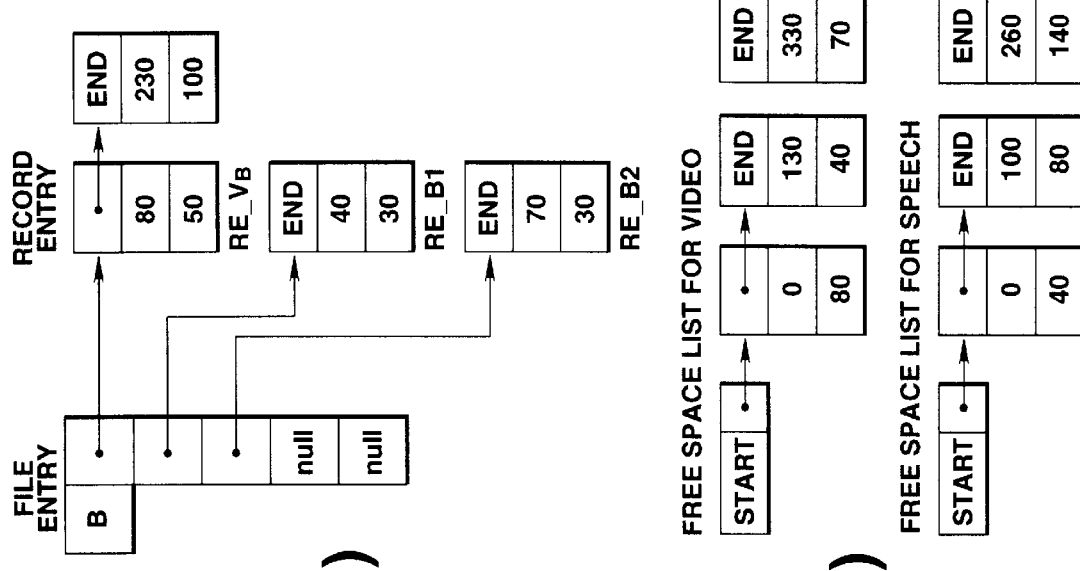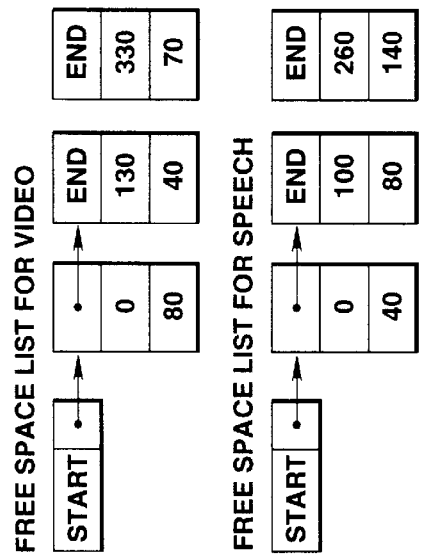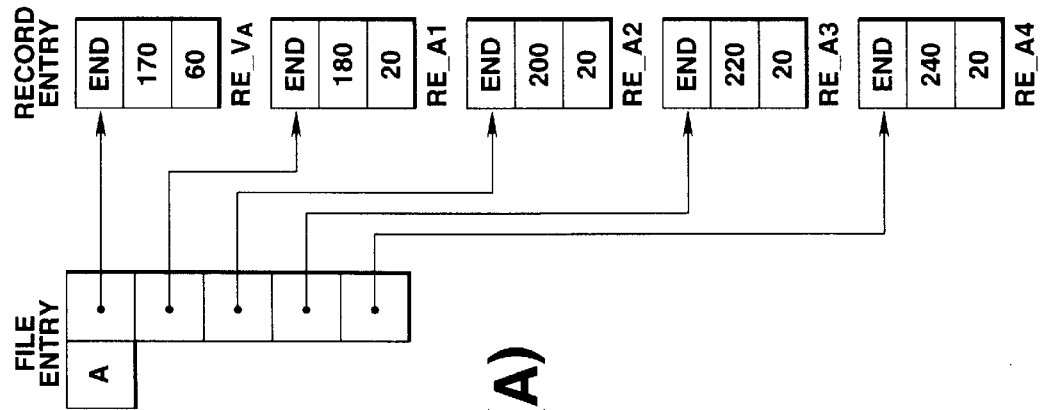
FIG.19(B)
FIG.19(C)
FIG.19(A)

| [VIDEO] | | |
|---|---|---|
| FILE(V1) . V | START(V1) | END(V1) |
| ............ | .......... | .......... |
| FILE(Vi) . V | START(Vi) | END(Vi) |
| ............ | .......... | .......... |
| FILE(VI) . V | START(VI) | END(VI) |
| [AUDIO1] | | |
| FILE(A11) .ch(A11) | START(A11) | END(A11) |
| ............ | .......... | .......... |
| FILE(A1j) .ch(A1j) | START(A1j) | END(A1j) |
| ............ | .......... | .......... |
| FILE(A1J) .ch(A1J) | START(A1J) | END(A1J) |
| [AUDIO2] | | |
| FILE(A21) .ch(A21) | START(A21) | END(A21) |
| ............ | .......... | .......... |
| FILE(A2k) .ch(A2k) | START(A2k) | END(A2k) |
| ............ | .......... | .......... |
| FILE(A2K) .ch(A2K) | START(A2K) | END(A2K) |
| [AUDIO3] | | |
| FILE(A21) .ch(A21) | START(A21) | END(A21) |
| ............ | .......... | .......... |
| FILE(A2l) .ch(A2l) | START(A2l) | END(A2l) |
| ............ | .......... | .......... |
| FILE(A2L) .ch(A2L) | START(A2L) | END(A2L) |
| [AUDIO4] | | |
| FILE(A21) .ch(A21) | START(A21) | END(A21) |
| ............ | .......... | .......... |
| FILE(A2m) .ch(A2m) | START(A2m) | END(A2m) |
| ............ | .......... | .......... |
| FILE(A2M) .ch(A2M) | START(A2M) | END(A2M) |

FIG.24

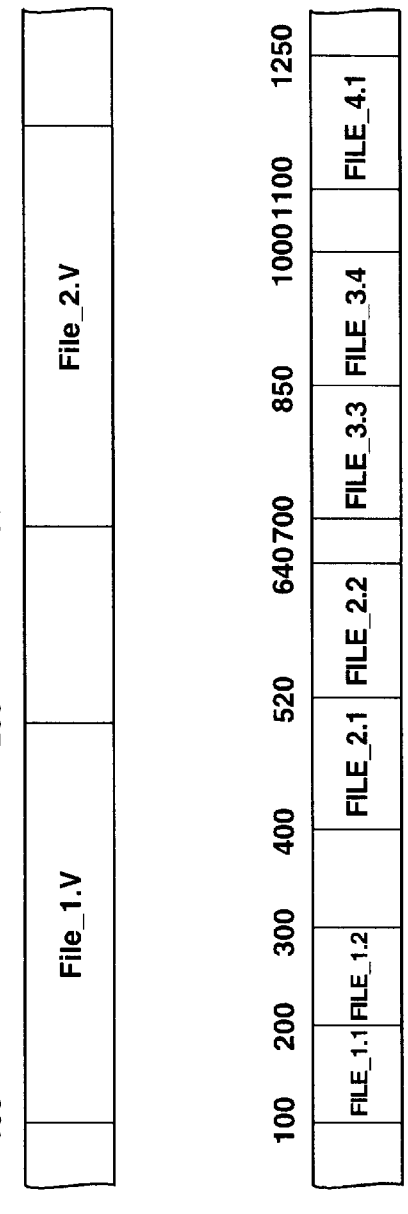

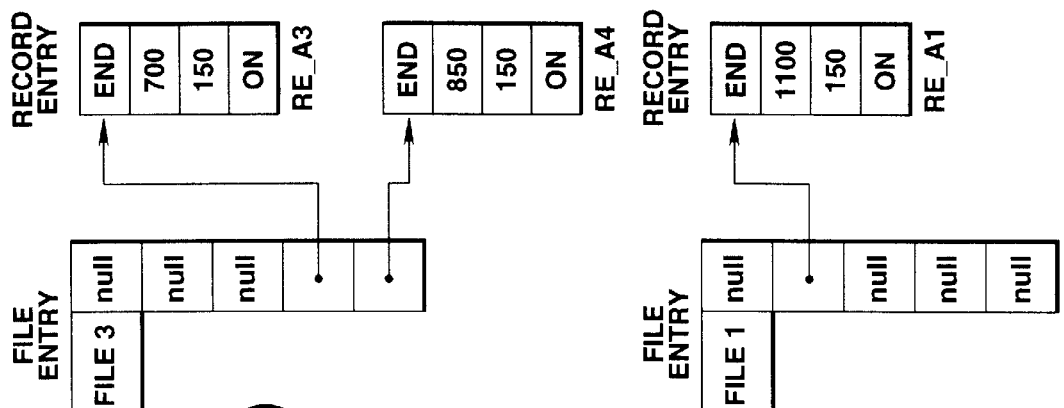
FIG.26(C)
FIG.26(D)
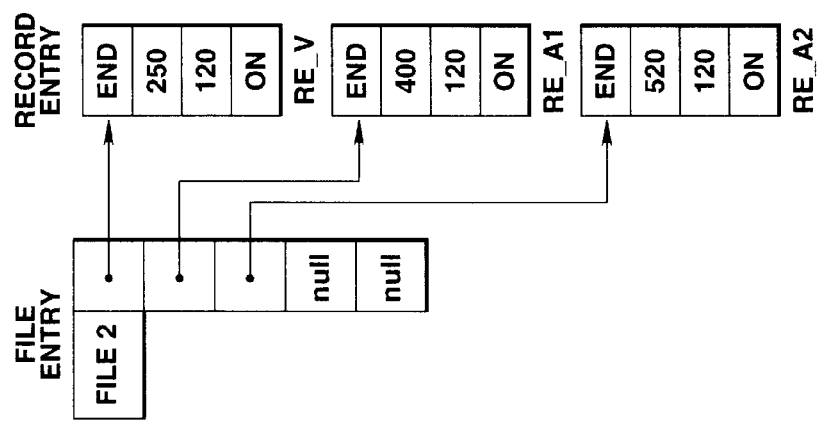
FIG.26(B)
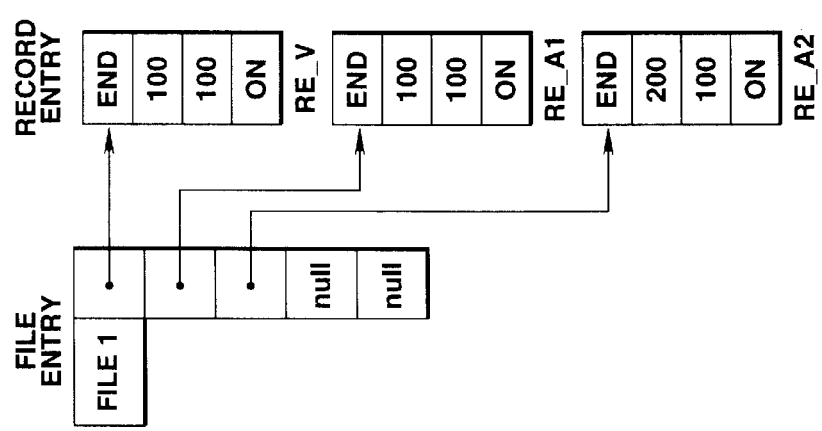
FIG.26(A)

OUTPUT CHANNEL

| | | | |
|---|---|---|---|
| VIDEO | FILE_1.V | FILE_2.V | MUTE |
| AUDIO1 | FILE_1.1 | FILE_2.1 | MUTE |
| AUDIO2 | MUTE | FILE_3.3 | |
| AUDIO3 | FILE_3.4 | | |
| AUDIO4 | FILE_4.1 | | MUTE |

| [VIDEO] | | |
|---|---|---|
| FILE_1.V | 10 | 40 |
| FILE_2.V | 20 | 60 |
| MUTE | 0 | 30 |
| [AUDIO1] | | |
| FILE_1.1 | 10 | 40 |
| FILE_2.1 | 20 | 60 |
| MUTE | 0 | 30 |
| [AUDIO2] | | |
| MUTE | 0 | 50 |
| FILE_3.3 | 50 | 100 |
| [AUDIO3] | | |
| FILE_3.4 | 0 | 100 |
| [AUDIO4] | | |
| FILE_4.1 | 30 | 110 |
| MUTE | 0 | 20 |

FIG.28

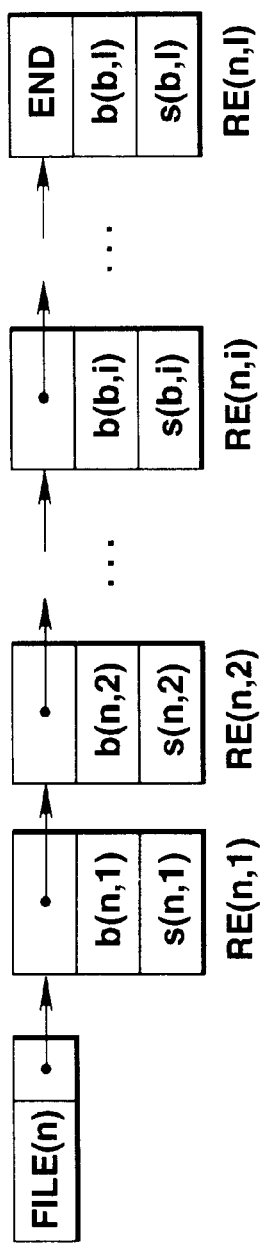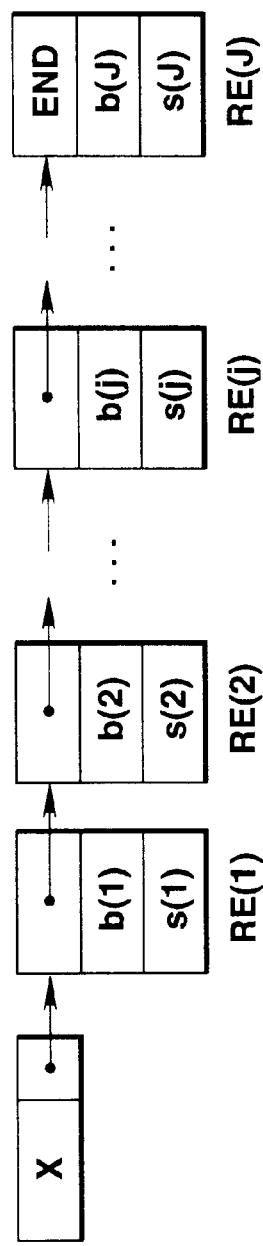
FIG.31(A)
FIG.31(B)

DATA RECORDING AND/OR REPRODUCING SYSTEM

BACKGROUND OF THE INVENTION

1. Field of the Invention

This invention relates to a method and apparatus for recording and/or reproducing data for recording and/or reproducing speech (audio) data or video data to or from a random-accessible recording medium.

2. Description of the Related Art

Recently, a hard disc array device, made up of a large number of interconnected large-capacity hard disc devices having a recording capacity of tens to hundreds of gigabytes (Gbs), is being put to practical use.

The hard disc array device is suited to recording data, such as speech and/or video data, having an extremely large data volume, and is excellent as an editing recording/reproducing apparatus because it can reproduce optional speech/video data in a short access time.

Meanwhile, the video data and the speech data are collectively recorded on the recording medium, such that, if data are managed on the file basis, the video data and the speech data are handled as a group. It is therefore difficult to handle the video data and the speech data independently of each other.

The result is such defects that the number of channels of speech data cannot be changed partway on the file basis, speech data files of different channels cannot be made to co-exist such that the number of channels has to be set to the maximum number with consequent waste of the recording medium, that an image and the maximum number of speech channels are used in case of data comprised of data made up only of the speech or data made up only of the image thus wasting the recording medium, and that it is not possible to change only the image or only optional chancels of the speech.

In addition, if, in editing the speech/video data, the totality of the edited speech/video data are re-recorded on a recording medium having the speech/video data as the object of editing recorded thereon, the totality of the speech/video data of the same contents as those of the edited speech/video data are recorded in duplicate, thus wasting the recording medium and disabling editing of speech/video data of prolonged time duration.

SUMMARY OF THE INVENTION

It is therefore an object of the present invention to provide a method and apparatus for recording and/or reproducing speech and/or video data in which, when recording plural speech/video data as an editing object are recorded on a random-accessible recording medium, such as a hard disc or a magneto-optical disc (MO disc), or reproducing optional speech/video data responsive to requests from an external device, such as an editing device, the video data and the speech data can be handled as independent files.

It is another object of the present invention to provide a method and apparatus for recording and/or reproducing speech and/or video data in which the speech/video data of the identical contents as the as-edited speech/video data (editing result data) can be reproduced without recording the totality of the speech/video data of the same contents in duplicates on the recording medium.

The data recording/reproducing apparatus according to the present invention includes first and second data recording/reproducing means for allocating a video data file and a speech data file each to one or more records and recording the thus allocated data files on respective random-accessible recording mediums while reproducing the recorded data files, and data management means for managing the data files thus recorded as records. The data management means manages the data files by a file entry, a video data record entry and a speech data record entry. The file entry has the file name of the data file, a record entry number of the leading record of the video data and a record entry number of the leading record of the speech data. The video data record entry is provided for each video record of the video data file and having a video record entry number of the next video record presenting data continuity with respect to the current video record, leading position data specifying the leading position of the recording area of the video record, recording length data specifying the size of the recording area of the current video record and a first control flag specifying whether or not the current video record can be deleted. The speech data record entry is provided for each speech record of the speech data file and has a speech record entry number of the next speech record presenting data continuity with respect to the current speech record, leading position data specifying the leading position of the recording area of the speech record, recording length data specifying the size of the recording area of the current speech record and a second control flag specifying whether or not the current speech record can be deleted.

The record means a group or assembly of data continuously recorded on the recording medium.

Preferably, vacant area managing means are provided for managing vacant areas for the video data files present in scattered state on the recording medium using link data specifying the link state to the next vacant area, leading position data specifying the leading position of the vacant area and area length data specifying the size of the vacant area, and another vacant area managing means are provided for managing vacant areas for the speech data files present in scattered state on the recording medium using link data specifying the link state to the next vacant area, leading position data specifying the leading position of the vacant area and area length data specifying the size of the vacant area.

With the above-described data recording/reproducing apparatus and method, a video data storage device and a speech data storage device, both being random-accessible, are separately provided for recording/reproducing video data and speech data. The video and speech data files, recorded in a state of bring divided into plural blocks by the data recording/reproducing mans, are managed by data management means using a file entry, a video data record entry and a speech data record entry. Each record entry of the video data and the speech data has a control flag including the information specifying the possibility of deletion. Thus, by designating part of at least one video and/or speech data file, a virtual data file which virtually becomes a video and/or speech data file can be formulated. In such virtual data file, the number of channels of speech data can be changed at any time, while data made up only of speech or only of video can be handled and only video or only optional speech channels can be changed.

In addition, by defining a virtual file MUTE of setting the playback level of the video or speech in such virtual video data file and describing MUTE in the control flag, it becomes possible to realize muting of optionally muting the speech or eliminating the video in the virtual data file.

BRIEF DESCRIPTION OF THE DRAWINGS

FIGS. 3(A)–3(D) illustrate a specified example of a recording example of video/speech data in the data recording/reproducing device shown in FIG. 1.

FIG. 8 illustrates an virtual data file as editing data outputted by the editing device shown in FIG. 1.

FIGS. 10(A)–10(C) illustrate an specified example of the file management information of the virtual data file.

FIG. 13 illustrates a generalized example of editing data for formulating the virtual data file.

FIGS. 16(A)–16(E) illustrate an example of the file management information used for file management in the data recording/reproducing device embodying the present invention.

FIGS. 18(A)–18(B) illustrate a recording example of the video/speech data in the data recording/reproducing device embodying the present invention.

FIGS. 19(A)–19(C) illustrate a specified example of the file management information used for file management of video/speech data in the data recording/reproducing device embodying the present invention.

FIG. 24 illustrates an example of an virtual data file according to the present invention.

FIGS. 25(A)–25(B) illustrate a recording example of the video/speech data in the data recording/reproducing device embodying the present invention.

FIGS. 26(A)–26(D) illustrate a specified example of the file management information used in the file management of the video/speech data in the data recording/reproducing device embodying the present invention.

FIG. 27 illustrates a specified example of the playback time chart of the virtual data file according to the present invention.

FIG. 28 illustrates a specified time chart of a virtual data file according to the present invention.

FIGS. 31(A)–31(B) illustrate a record entry of the record entry of the data file in the recording medium according to the present invention and the record entry of the virtual data file.

DESCRIPTION OF THE PREFERRED EMBODIMENTS

In the data recording/reproducing and/or reproducing method and device according to the present invention, random-accessible data recording/reproducing means for video and that for speech are provided separately for recording/reproducing video and speech data, and data files recorded as one or more records recorded by these data recording/reproducing means are managed by data management means using the file entry, video data record entry and the speech data record entry. The record entry of each of the video data and the speech data has a control flag including the information as to whether or not deletion is possible.

Before proceeding to description of a preferred embodiment of the present invention, a typical data recording/ reproducing apparatus, for recording/reproducing video data and speech data as a group, is explained as a data recording/ reproducing device for illustrating the present invention.

Figure 1:
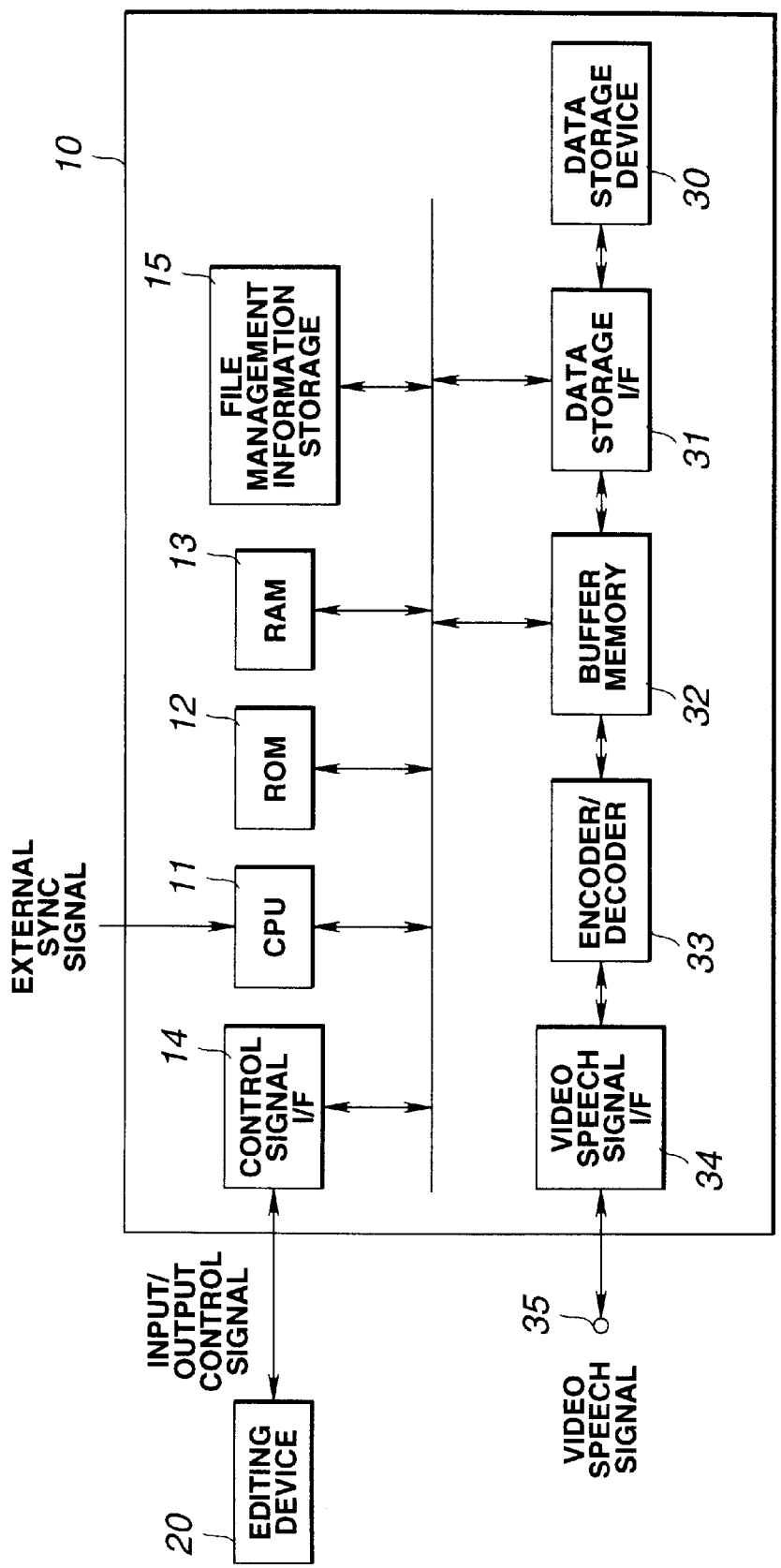
FIG. 1 is a block diagram showing the structure of a data recording/reproducing device for illustrating the present invention.

FIG. 1 shows, in a block diagram, a system configuration of a data recording/reproducing device 10 for illustrating the present invention.

Referring to FIG. 1, an editing device 20 is connected to the data recording/reproducing device 10 and generates an input/output control signal for controlling the data recording/reproducing device 10. The recording/reproducing device 10 records plural speech data and/or video data (speech/video data) for supplying the speech/video data as an editing object to the editing device 20. In addition, the data recording/reproducing device 10 receives data (editing data) from the editing device 20 and reproduces the speech/video data of the same contents as the editing result data (speech/video data obtained as a result of the editing) based on the editing data. The editing data is data specifying which portion of the data materials is used in the editing result data.

Referring to the internal structure of the data recording/reproducing device 10, there are connected to a bus line 16 a micro-processing unit (CPU) 11, a read-only memory (ROM) 12, having stored therein the program for the CPU, a random access memory (RAM) 13 as a working area in which the CPU executes the program, a control signal interfacing circuit (control I/F circuit) 14 and a file management information storage unit 15, such as a hard disc, for storage of the file management information as later explained. The above components make up a control computer. The constituent portions of the data recording/reproducing device 10 are controlled and the recording area of each of the speech data and the video data recorded in the data storage device 30 is managed based on the editing data entered from the editing device 20. That is, the CPU (microprocessor unit) 11 is constituted by, for example, a general-purpose micro-processor or a reduced instruction set computer (RISC) micro-processor and its peripheral circuit. The CPU 11 executes a program stored in the ROM 12, using the RAM 13, and exchanges editing data and the response data to and from the editing device 20 via the control I/F circuit 14.

The data storage device 30 is a large-capacity random-accessible data recording/reproducing device, such as a hard disc array device, and performs data input/output with an interfacing circuit (data storage I/F circuit) 31, such as SCSI, connected to the bus line 16. The data storage I/F circuit 31 performs data input/output with a buffer memory 32 connected to the bus line 16. The buffer memory 32 performs data input/output with an encoder/decoder 33 and performs data buffering with data of the high-speed intermittent data storage device 30. The encoder/decoder 33 performs data compression/expansion as the occasion may demand and performs input/output of the speech/video signals with an external terminal 35 via an interfacing circuit for speech/video signals (speech video signal I/F circuit) 34.

The CPU 11 of the data recording device 10 controls the data storage device 30 via data storage I/F circuit 31 in synchronism with synchronization signals, such as reference signals of a broadcasting station, and manages control for storing speech/video data in the data storage device 30 responsive to the request from the external equipment, such as the editing device 20, while furnishing the recorded speech/video data to an external equipment, such as the editing device 20. The CPU 11 generates recording area data or the file management information specifying a recording area taken up by each of the speech data and the video data on the recording medium (hard disc or the like) of the data storage device 30. In addition, the CPU 11 generates recording area data or the file management information for partial data (the portions of the speech/video data or material data contained in the editing result data, that is specifying the recording area taken up by the partial data on the recording medium of the data storage device 30. In addition, the CPU 11 manages control for storing recording area data or the file management information thus generated in the RAM 13 and in the file management information storage unit 15, such as a hard disc.

An illustrative example of management of recording data of the data storage device 30 employing the file management information or the recording area data is hereinafter explained.

Figure 2A:
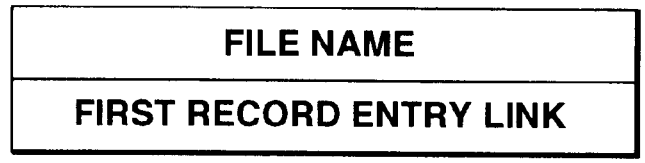
FIGS. 2(A)–2(C) show an example of the file management information used for file management in the data recording/reproducing device shown in FIG. 1.
Figure 2B:
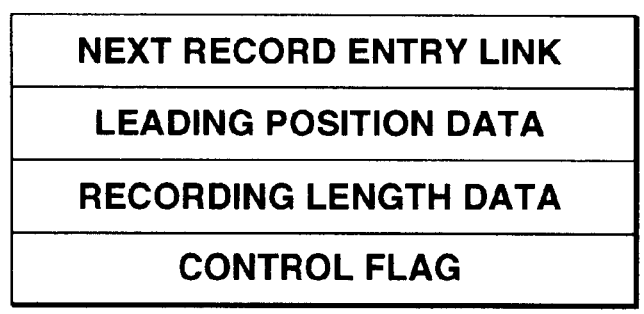
Figure 2C:

FIG. 2 shows an example of the file management information or the recording area data. The file management information, write/readout controlled by the CPU 11 with respect to the file management information storage unit 15, is formulated as a list (record entry) of the type of the so-called linked list.

In the file management information, shown in FIG. 2, (A) denoted a 'file entry' having a 'file name' indicating the name of a file and 'a first record entry link' specifying the record entry number associated with the data to be recorded/reproduced in the file. The record means a group of data continuously recorded on the recording medium of the data storage device 30. In FIG. 2, (B) denotes a 'record entry' having 'a next record entry link' specifying the record entry number associated with the data of the file to be recorded/reproduced, a 'leading position data' specifying the leading address of data continuously recorded on the recording medium of the data storage device 30, that is a record, a 'recording length data' specifying the data size of the record, and a 'control flag' including the information indication whether or not the data of the record may be deleted. If the link data of the 'next record entry link' is an END data, there is no next record entry. It is the last portion of the speech/video data that is recorded in the recording area specified by the record entry. The 'control flag' specifies, as a deletion possibility flag, that associated data can or cannot be deleted if the flag is on or off, respectively. It can also specify MUTE, that is that reproduction is not performed. In FIG. 2, (C) denotes a 'free space list' specifying the vacant area on the recording medium of the data storage device 30, and has a 'next free space link' specifying the free space number associated with the next vacant area, a 'leading position data' specifying the leading address o the free space and a recording length data' specifying the size of the free space. The address of the free space or the size of the recording length data may be represented in terms of blocks as units. The block size may be set so as to be equal to one sector of a HDD (hard disc device), such as 512 bytes, multiplied by the number of HDDs used as RAID, such as 8, for example, 4 kilobytes (kBs).

FIG. 3 shows a example of recording speech/video data when employing the file management information, specifically, an illustrative example of the recording area taken up by, for example, two speech/video data A and B in the recording medium of the data storage device 30 and the file management information FIG. 3(A) shows an illustrative example of the recording data on the recording medium of the data storage device 30. The speech/video data A is recorded in the 170th to 229th block as from the leading end of the recording medium, in which a block is, for example, 4 kBs. The speech/video data B is recorded in the 80th to 129th block and from 230th to 329th block as from the leading end of the recording medium, with the other recording area being a vacant recording area.

Since there are occasions wherein one speech/video data is divisionally recorded in plural recording areas, the CPU 11 formulates the file management information of each of the speech/video data A and the speech/video data B as list of the linked list (record entry) shown in FIGS. 3B and 3C. To each record entry is appended a deletion possibility specifying flag specifying whether or not the record can be safely deleted, more generally a control flag. This control flag being turned on specifies that the record can safely be deleted. The CPU 11 also generates vacant recording area data specifying the vacant recording area (free space) of the data storage device 30 as a list of the linked list type (free space list) as shown in FIG. 3(D).

The operation of the above-described data recording/reproducing device is explained mainly with respect to the playback operation for the record entry and playback entry.

First, the operation when the data recording/reproducing device 10 shown in FIG. 1 records the speech/video signal entered from outside on the data storage device 30 is explained with reference to recording of the speech/video signal A shown in FIG. 3(A).

Figure 4:
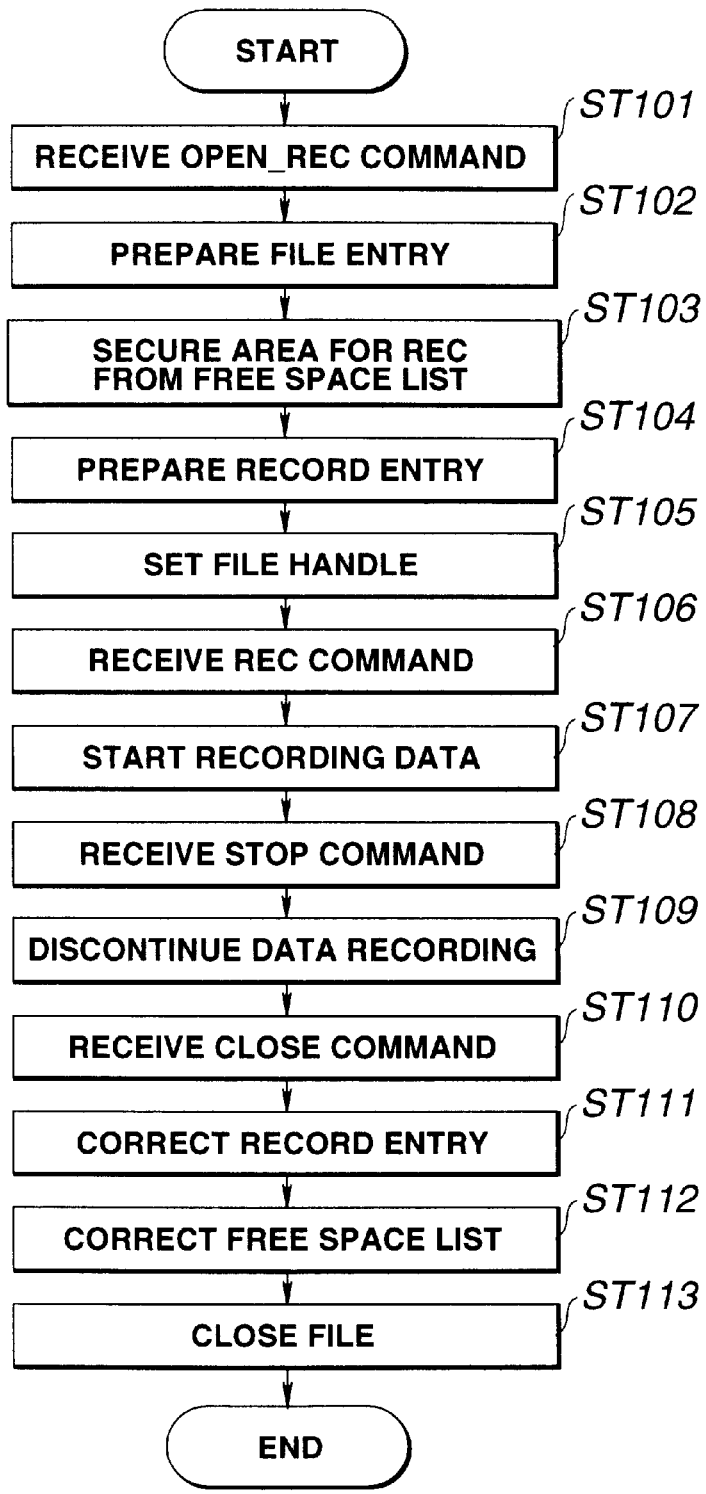
FIG. 4 is a flow chart for illustrating the processing for recording the video/speech data entered from outside the data recording/reproducing device shown in FIG. 1.
Figure 5:
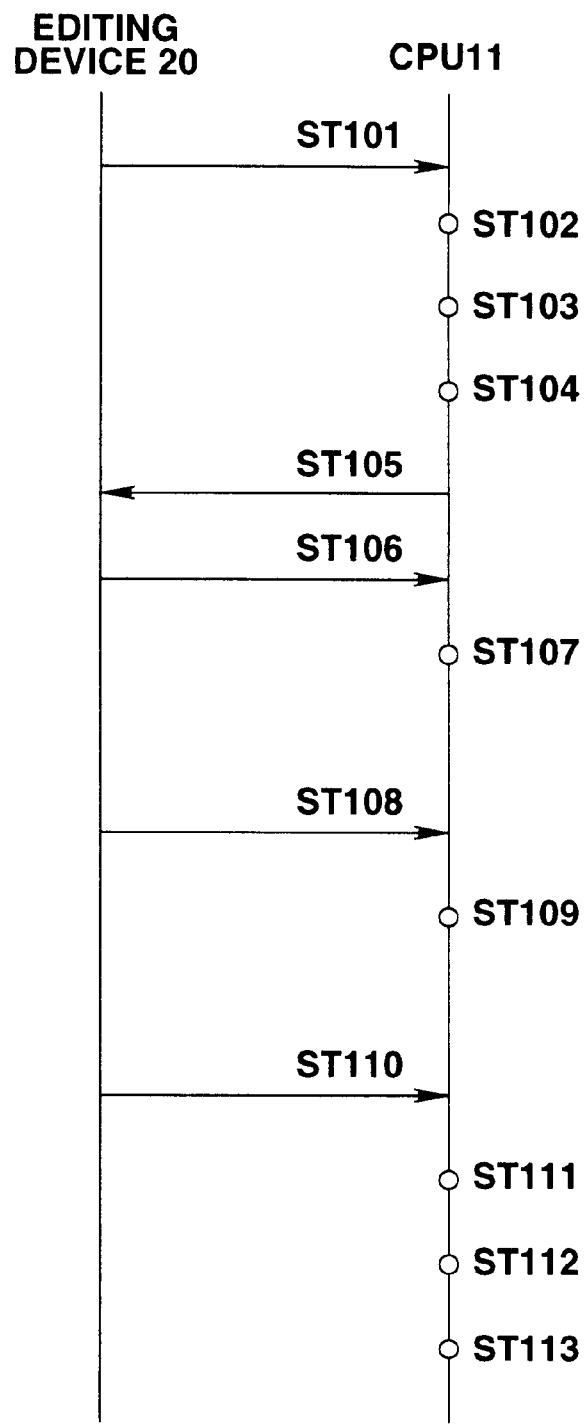
FIG. 5 shows a sequence of transmission/reception of control signals between the data,recording/reproducing device shown in FIG. 1 and an external editing device in case of recording video/speech data entering the recording/reproducing device from outside.

FIG. 4 shows, in a flowchart, the processing by the CPU 11 of the data recording/reproducing device 10 for recording speech/video data entered from outside on the data storage device 30, while FIG. 5 is a sequence chart for control signals between the editing device 20 and the data recording/reproducing device 10 when recording speech/video data entered from outside on the data storage device 30.

Referring to FIGS. 4 and 5, the editing device 20 outputs to the CPU 11 of the data recording/reproducing device 10 a command including pre-set data, such as filename (A) and a data length (60 blocks) and which commands the CPU 11 of the data recording/reproducing device 10 to formulate a record entry for the speech/video data (OPEN-REC command). The CPU 11 receives this OPEN-REC command.

At step ST102, the CPU 11 of the data recording/reproducing device 10 generates the file entry (FIGS. 2(A) and 3(B)) for storage in the RAM 13 and in the file information storage unit 15.

At step ST103, the CPU 11 of the data recording/reproducing device 10 analyzes the space list stored in the RAM 13 or in the file information storage unit 15 and secures an area for recording.

At step ST104, the CPU 11 of the data recording/reproducing device 10 generates a record entry (FIG. 2(B) and FIG. 3(B)) based on data such as file name included in the OPEN-REC command for recording in the RAM 13 or in the file information storage unit 15.

At step ST105, the CPU 11 of the data recording/reproducing device 10 sets a file handle (FIG. 2(A)) for the editing device 20 to access the opened file to send the set file handle to the editing device 20.

At step ST106, the editing device 20 outputs a command of starting the recording of the speech/video data A (REC command) to the data recording/reproducing device 10. The CPU 11 of the data recording/reproducing device 10 receives this REC command.

At step ST107, the CPU 11 of the data recording/reproducing device 10 receiving the REC command manages control for recording the speech/video data entered from the external equipment on the data storage device 30 in the order in which the data is stated in the record entry.

At step ST108, the editing device 20 outputs to the data recording/reproducing device 10 a command (STOP command) of terminating recording of the speech/video data A. The data recording/reproducing device 10 receives this STOP command.

At step ST109, the CPU 11 of the data recording/reproducing device 10 receiving the STOP command manages control to terminate the recording of the speech/video data A in the data storage device 30.

At step ST110, the editing device 20 outputs to the data recording/reproducing device 10 a command (CLOSE command) of correcting (updating) the record entry and the free space list. The CPU 11 of the data recording/reproducing device 10 receives this CLOSE command.

At step ST111, the size of the recorded data is recorded in an item of the recording length data of the record entry to close the file.

At step ST112, the area secured for recording without being used is opened and added to the free space list.

At step ST113, the recording file is closed.

The operation of the data recording/reproducing device 10 in reproducing the speech/video signals recorded in the data storage device 30 is hereinafter explained.

Figure 6:
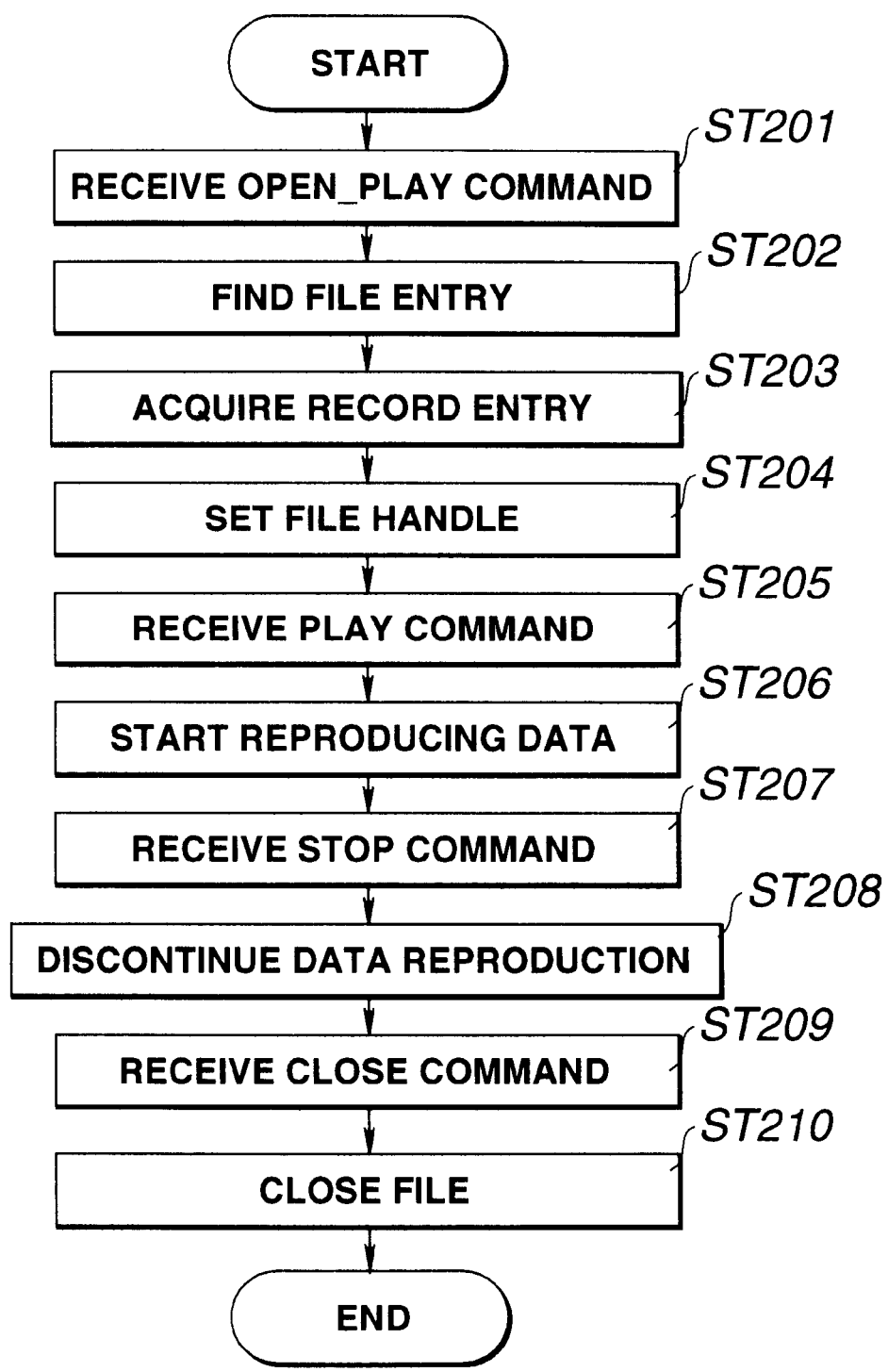
FIG. 6 is a flowchart illustrating the processing for reproducing video/speech data recorded in the data recording/reproducing device shown in FIG. 1.
Figure 7:
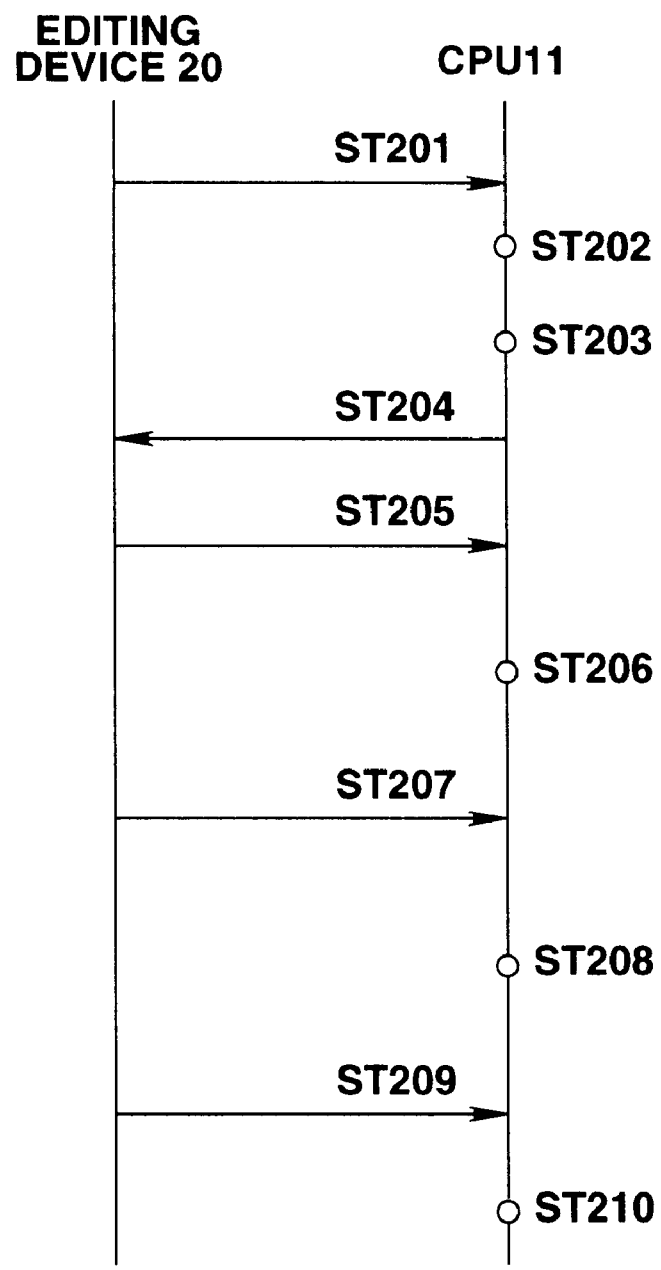
FIG. 7 shows a sequence of transmission/reception of control signals between the data recording/reproducing device shown in FIG. 1 and an external editing device in case of reproducing video/speech data in the data recording/ reproducing device shown in FIG. 1.

FIG. 6 is a flowchart illustrating the processing when the CPU 11 of the data recording/reproducing device 10 shown in FIG. 1 reproduces the speech/video data. FIG. 7 is a sequence chart of control signals exchanged between the editing device 20 and the CPU 11 of the data recording/reproducing device 10 shown in FIG. 1 when the data recording/reproducing device 10 reproduces the speech/video data recorded on the data storage device 30.

At step ST201, the editing device 20 outputs to the data recording/reproducing device 10 a command (OPEN_PLAY command) of making ready for reproduction of speech/video data, inclusive of the data such as file name (A). The CPU 11 of the data recording/reproducing device 10 receives this OPEN_PLAY command.

At step ST202, the CPU 11 of the data recording/reproducing device 10 retrieves the file name of optional data of the OPEN_PLAY command from the file name item of the file entry stored in the RAM 13 and in the file management information storage unit 15 and acquires the record entry of the speech/video data A based on the retrieved results.

At step ST203, the contents of the record entry are sequentially acquired from the first record entry item of the retrieved file entry.

At step ST204, the data recording/reproducing device 10 sets a file handle for the editing device 20 to access the opened file, and sends the file handle thus set to the editing device 20.

At step ST205, the editing device 20 outputs to the data recording/reproducing device 10 a command for starting reproduction of the speech/video data A (PLAY command). The CPU 11 of the data recording/reproducing device 10 receives this PLAY command.

At step ST206, the CPU 11 of the data recording/reproducing device 10 takes out the speech/video data A recorded in the data storage device 30 from the area stated in the record entry and sequentially reproduces the speech/video data recorded in the data storage device 30 to output the reproduced data to the editing device 20.

At step ST207, the editing device 20 outputs to the data recording/reproducing device 10 a command for discontinuing reproduction of the speech/video data A (STOP command). The data recording/reproducing device 10 receives this STOP command.

At step ST208, the data recording/reproducing device 10 controls the data storage device 30 to discontinue reproduction of the speech/video data A.

At step ST209, the editing device 20 outputs to the data recording/reproducing device 10 a command for closing the playback file (CLOSE command). The data recording/ reproducing device 10 receives this CLOSE command.

At step ST210, the editing device 20 closes the file of the speech/video data A.

Meanwhile, since the data storage device 30 of the data recording/reproducing device 10 is a random-accessible device employing a hard disc array, such as so-called RAID, the speech/video data of the editing result can be obtained by employing a list of start or end positions of the partial data, as the contents of the editing result data of the original plural speech/video data files, and by sequentially reproducing the partial data on the real-time basis in accordance with the list, without the necessity of newly recording the editing result data which are the result of the editing performed using the speech/video data file as plural editing data materials. This editing is termed non-destructive editing, while the speech video data file of the result of editing, constructed by the list of the partial data, is termed a virtual data file.

FIG. 8 illustrates a list of editing data or contents of the virtual data file (VFL) outputted by the editing device 20 of FIG. 1 to the data recording/reproducing device 10. That is, the editing data outputted by the editing device 20 to the CPU 11 of the data recording/reproducing device 10 is made up of reproduction start position data and reproduction end position data respectively indicating the leading position and the end position of partial data in data materials, as well as the file names, as shown in FIG. 8. The data material means the speech/video data having portions used in the editing result data. The partial data means the portions of the data materials ultimately included in the editing result data.

Figure 9:
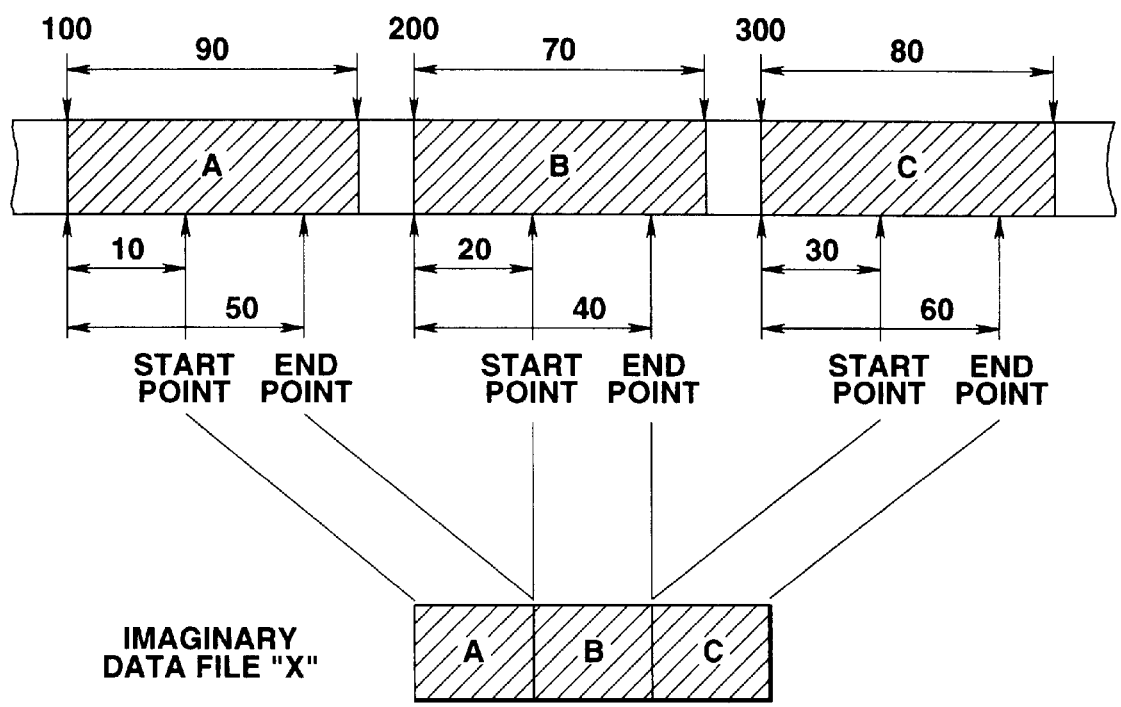
FIG. 9 illustrates a typical example of recording data on a recording medium of a data storage device in the data recording/reproducing device shown in FIG. 1 and a virtual data file obtained on editing these recording data.

FIGS. 9 and 10 illustrate a recording example of the virtual data file edited using the VFL as the contents of the virtual data file or the editing data shown in FIG. 8, and a specified example of the file management information.

That is, FIG. 9 shows a specified example of recording data on the recording medium of the data storage device 30 and the virtual data file, while FIGS. 10(A), 10(B) and 10(C) denote an example of the file management information of the recording data file on the recording medium, an example of the editing data for obtaining a virtual data file "X" and an example of the file management information of the virtual data file "X", respectively.

In the specified example, shown in FIGS. 9 and 10, the files "A", "B" and "C" are recorded as editing result data in the 100th to 189th blocks, 200th to 269th blocks and in the 300th to 379th blocks as from the leading end of the medium, respectively, as editing data material. By editing, the partial data included in a range of from the tenth block to the 50th block of the file "A", the partial data included in a range of from the 20th block to the 60th block of the file "B" and the partial data included in a range of from the 30th block to the 60th block of the file "C" are contained in this order in the virtual data file "X" representing the editing result data.

The editing device 20 of FIG. 1 outputs the editing data shown in FIG. 10(B) to the control signal I/F circuit 14 of the data recording/reproducing device 10. Based on the editing data from the editing device 20 (FIG. 10(B)) and the record entry on the recording medium (FIG. 10(A)), the CPU 11 of the data recording/reproducing device 10 performs control for storing in the RAM 13 and in the file management information storage unit 15 the file name "X" shown in FIG. 10C and link data representing the reciprocal connection between respective playback entries specifying the recording position of each partial data to be reproduced. Moreover, the CPU 11 manages control for generating recording area data (playback record entries) and for appending the value of the deletion possibility indicating flag (generally a control flag) turned off to the generated recording area data for storage in the RAM 13 or in the file management information storage unit 15, as shown in FIG. 10(C). The recording area data specifies that the partial data contained in the files "A", "B" and "C" as the data material are data recorded in the 40 blocks as from the 110th block, in the 20 blocks as from the 220th block and in the 30 blocks as from the 330th block as from the leading end of the recording area of the recording medium of the data storage device 30.

It is possible to store the editing data shown in FIG. 10(B) directly in the RAM 13 or in the file management information storage unit 15 and to calculate the recording area of the partial data during reproduction. However, if the playback entry is generated in the linked list shown in FIG. 10(C) for storage in the RAM 13 or in the file management information storage unit 15, it becomes unnecessary to calculate the recording area for the partial data during reproduction to render it possible to promptly reproduce the speech/video data of the same contents as those of the editing result data. If the partial data is divided into only a small number of blocks, reproduction is not particularly obstructed by the calculation processing time of the recording area of the partial data during reproduction. However, the larger the number of division of the partial data, the longer becomes the processing time involved in calculations, thus possibly obstructing the reproduction. Therefore, if the editing data of the editing result data including a large number of partial data is fed from the editing device 20 to the data recording/ reproducing device 10, the merit of previously generating the playback entry is increased.

The editing processing by the editing device 20 employing the editing data shown in FIGS. 8 or 10 is now explained.

An editor enters data specifying the desired speech/video to the editing device 20. The latter then generates editing data in accordance with the record entry received from the data recording/reproducing device 10 and data entered by the editor and outputs the generated editing data to the data recording/reproducing device 10. The editing data, shown in FIG. 8 and in FIG. 10(B), specify the partial data used for the speech/video data for a program and the sequence of the partial data.

The CPU 11 of the data recording/reproducing device 10 performs control for storing the received editing data in the RAM 13 and in the file management information storage unit 15 for reproducing the speech/video data of the same contents as the editing result data based on the stored editing data (FIG. 8 and 10(B)). The playback record entries are preferably generated in advance in the form of the linked list as shown in FIG. 10(C) and to store the generated playback record entries in the RAM 13 and in the file management information storage unit 15, as explained previously.

Figure 11:
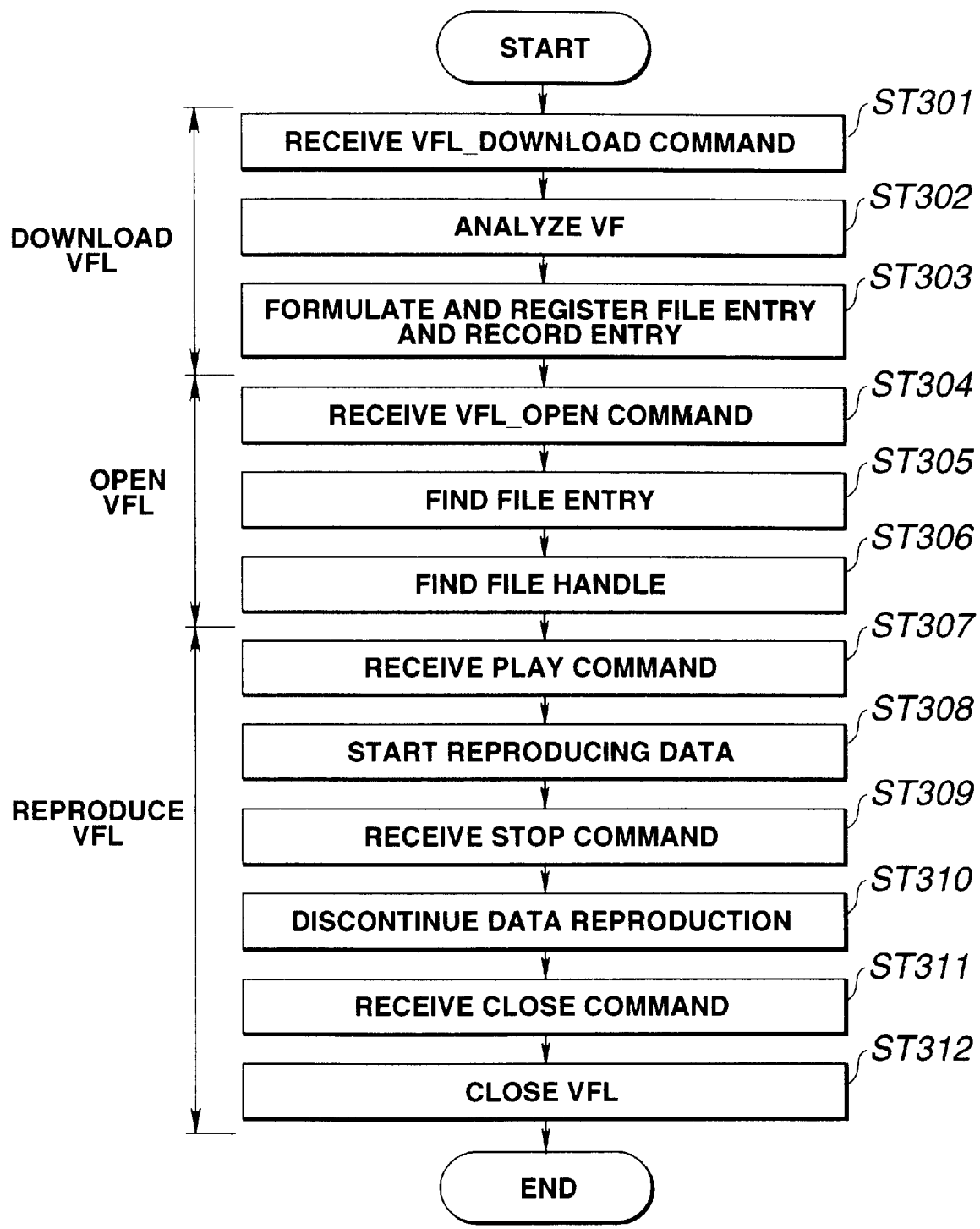
FIG. 11 is a flowchart illustrating the processing in reproducing video/speech data using editing data used for formulating the virtual data file.

FIG. 11 shows, in a flowchart, the processing for reproducing the speech/video data based on the editing data (video file list (VFL)) based on the editing data shown in FIGS. 8 or 10(B).

In FIG. 11, the editing device 20 outputs at step ST301 a command (VFL-DOWNLOAD command) to the data recording/reproducing apparatus. The VFL-DOWNLOAD command is a command for causing the editing data including editing data VFL to be received by the data recording/ reproducing device 10. The data recording/reproducing device 10 receives this VFL-DOWNLOAD command.

At step ST302 and step ST303, the data recording/ reproducing device 10 analyzes the received editing data VFL (FIG. 10(B)) and the record entries of the speech/video data (FIG. 10(A)) and generates the playback entries of the editing result data X and its file entries (FIG. 10(C)) for storage in the in the RAM 13 and in the file management information storage unit 15.

At step ST304, the editing device 20 outputs to the data recording/reproducing device 10 a command (VFL_OPEN command) of combining the partial data based on the playback entries for making ready for the reproduction of the speech/video data of the same contents as those of the editing result data. The data recording/reproducing device 10 receives this VFL-OPEN command.

At step ST305, the CPU 11 of the data recording/reproducing device 10 retrieves the playback entries of the editing result data X stored in the RAM 13 and in the file management information storage unit 15. At this time, the playback entries of the virtual file "X" as the editing result data are treated in the identical way as the files "A" to "C" of the speech/video data.

At step ST306, the CPU 11 of the data recording/reproducing device 10 generates a file handle.

At step ST307, the editing device 20 outputs the PLAY command to the data recording/reproducing device 10. The data recording/reproducing device 10 receives this PLAY command.

At step ST308, the CPU 11 of the data recording/reproducing device 10 controls the data storage device 30 for reproducing the partial data from the data storage device 30 based on the playback entry.

At step ST309, the editing device 20 outputs the above-mentioned STOP command to the data recording/reproducing device 10. The data recording/reproducing device 10 receives this STOP command.

At step ST310, the CPU 11 of the data recording/reproducing device 10 controls the data storage device 30 for discontinuing the reproduction of the partial data.

At step ST311, the editing device 20 outputs the above-mentioned CLOSE command to the data recording/reproducing device 10. The data recording/reproducing device 10 receives this CLOSE command.

At step ST312, the CPU 11 of the data recording/reproducing device 10 closes the file of the editing data VFL.

Next, the processing by the CPU 11 of the data recording/reproducing device 10 generating the playback entry from the editing data (ST302 in FIG. 11) is explained in more detail.

Figure 12:
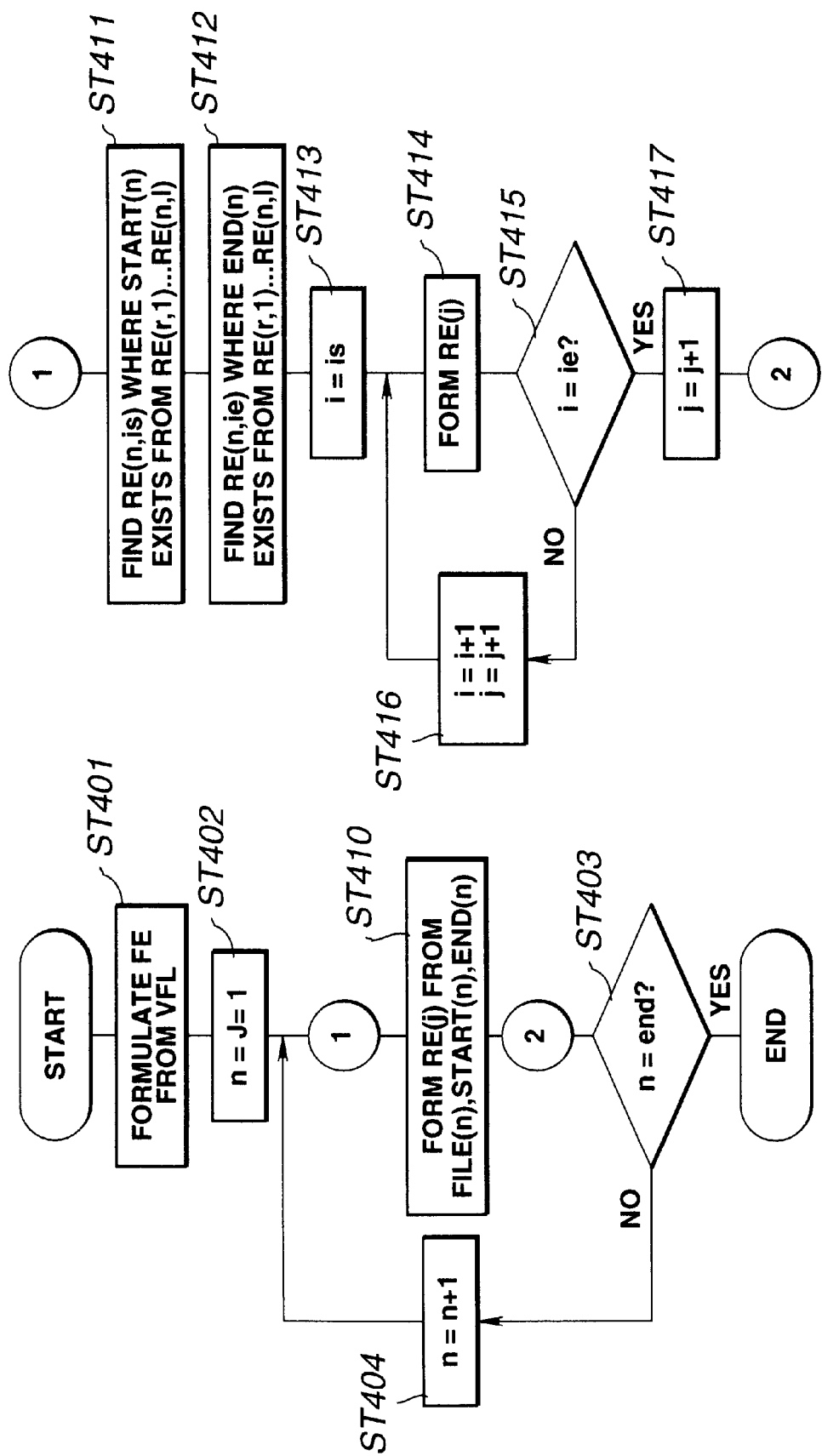
FIG. 12 is a flowchart illustrating the processing for formulating a file entry and a record entry in the flowchart of FIG. 11.

FIG. 12 shows, by a flowchart, the processing by the CPU 11 of the data recording/reproducing device 10 generating the playback entry from the editing data configured for generating the virtual data file.

Figure 14A:
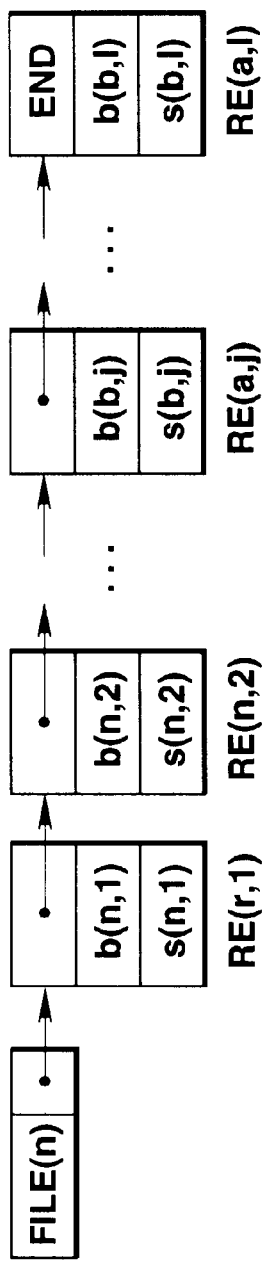
FIGS. 14(A)–14(B) illustrate a record entry of the data file and the record entry of the virtual data file on the recording medium.
Figure 14B:
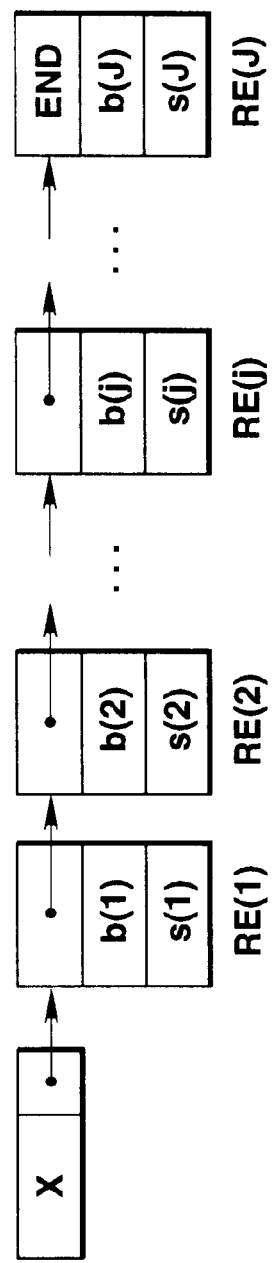

FIG. 13 shows, in a generalized form, the editing data used for formulating a virtual data file. FIGS. 14(A) and 14(B) illustrate a record entry on the recording medium and a playback record entry of a virtual data file.

Referring to FIG. 12, the CPU 11 formulates at step ST401 a file entry FE from the editing data VFL configured for formulating the virtual data file.

At step ST402, the CPU 11 sets the value of variables n and j to 1. The variable n is used for retrieving the file name data of the record entry of the data materials (FIG. 14(A)), while the variable j is used for retrieving partial data included in the playback record entry (FIG. 14(B)).

At step ST410, the CPU 11 formulates the playback entry from the file name data (FILE(n)), playback start position data (START(n)) and playback end position data (END(n)), as shown in detail by the steps ST411 to ST417.

At step ST411, the CPU 11 of the data recording/reproducing device 10 retrieves and finds the record entry (RE(n)) of the data materials where the playback start position data (START(n)) exists.

At step ST412, the CPU 11 of the data recording/reproducing device 10 retrieves and finds the record entry (RE(n)) of the data materials where the playback end position data (END(n)) exists.

At step ST413, the CPU 11 of the data recording/reproducing device 10 sets the variable i to a value is. Meanwhile, the variable i is used for retrieving data included in the record entry.

At step ST414, the CPU 11 of the data recording/reproducing device 10 generates the playback entry (RE(j)) of the editing result data X.

At step ST415, the CPU 11 of the data recording/reproducing device 10 checks whether not the value of the variable i is equal to a value ie. Meanwhile, value ie means the number of the playback entries. If the value of the variable i is not equal to a value ie, processing transfers to step ST416. If the value of the variable i is not equal to a value ie, processing transfers to step ST417.

At step ST416, the CPU 11 of the data recording/reproducing device 40 increments the variables i, j by 1 before reverting to step ST414.

At step ST417, the CPU 11 of the data recording/reproducing device 40 increments the variable j by 1 before proceeding to step ST403.

At step ST403, the CPU 11 of the data recording/reproducing device 40 judges whether or not the value of the variable n is a value end. The value end indicates the number of the data materials. If the value of the variable n is a value end, processing comes to a close and, if otherwise, processing transfers to step ST404.

At step ST404, the CPU 11 of the data recording/reproducing device 10 increments the variable n before proceeding to step ST410, that is processing of step ST411.

The processing of the the data recording/reproducing device 10 in deleting the record entry of the speech/video data (data materials) and playback entry of the editing result data and updating the free space list is hereinafter explained.

On reception of a command for deleting the speech/video data from the editing device 20, the CPU 11 of the data recording/reproducing device 10 retrieves the record entries and deletes only those having the value ON of the deletion possibility indicating flag, while adding a recording areas of the data storage device 30 specified by the deleted record entries to the free space list.

The CPU 11 does not delete those record entries having the value OFF of the deletion possibility indicating flag.

On reception of a command for deleting the playback entries from the editing device 20, the CPU 11 of the data recording/reproducing device 10 retrieves the playback entries and deletes those playback entries having the value ON of the deletion possibility indicating flag.

Since the value of the deletion possibility indicating flag of the playback entry is ON as described above, the data materials referred to by the playback entries (partial data) usually are not deleted by the deletion command from the editing device 20.

By modifying the processing contents of the data recording/reproducing device 10 as described above, the speech/video data having the same contents as those of the editing result data can be reproduced without the necessity of recording the editing result data in the data storage device. In addition, since the playback entries are previously generated and the reproduction is performed based on the playback entries, the processing time for calculating the recording area for partial data may be eliminated, so that the processing time for calculating the recording area is not obstructive to reproduction.

Moreover, for generating the playback entries, it is only necessary to rewrite the storage contents of the RAM 13 or the file management information storage unit 15. In addition, since the processing for deleting the recording area data is subject to limitations by the deletion possibility indicating flag, there is no risk of inadvertent deletion of the data materials referred to by the playback entries.

The above-described embodiment is yet to be improved in such respects that the number of channels of speech data cannot be modified partway on the file basis in, for example, the virtual data file, those files having the different numbers of speech data channels cannot coexist in the virtual data file, such that the number of the speech channels has to be set to the maximum value thus wasting the recording medium, the recording area for video and the maximum number of the speech channels is used even if the virtual data file is made up only of speech data or only of video data, thus again wasting the recording medium, and that it is not possible to change only the video or only optional channels of speech data in the virtual data file.

If the speech and the video can be separately stated in virtual data files, it becomes necessary to perform such processing as reproducing the speech without reproducing the video for a given time duration or not reproducing only the speech channel for another time duration. It is therefore necessary to be able to perform processing such as muting the playback in a virtual data file.

Thus, in the data recording/reproducing apparatus according to the present invention, a data storage device as random-accessible data recording/reproducing means for video for recording/reproducing video data and another data storage device as random-accessible data recording/reproducing means for speech for recording/reproducing speech data are provided separately, and the data files recorded as one or more records by these data recording/reproducing means are managed by data management means using the file entries, video data record entries and the speech data record entries. Each record entry of the video data and the speech data includes control flags having the information specifying the deletion possibility and the MUTE information.

Referring to the drawings, a preferred embodiment of the data recording and/or reproducing device 40 of the present invention will be explained in detail.

Figure 15:
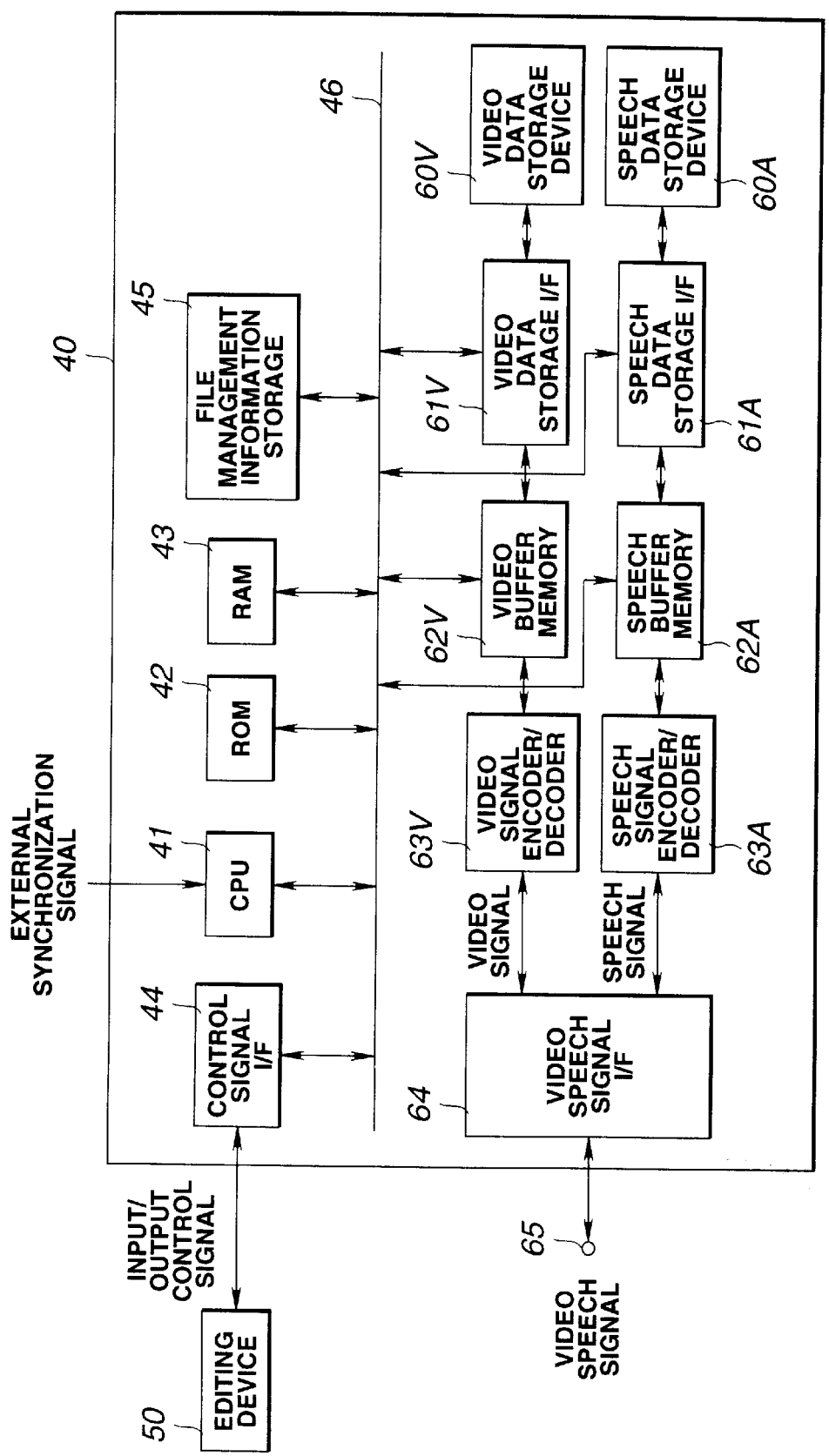
FIG. 15 is a block diagram illustrating an example of a system configuration of a data recording/reproducing device embodying the present invention.

FIG. 15 shows, in a block diagram, a system configuration of a recording/reproducing apparatus embodying the present invention.

In the embodiment of FIG. 15, a video data storage device 60V and a speech data recording/reproducing device 60A are provided in the data recording/reproducing device 40. The video data storage device 60V divides the video data file into plural blocks for recording the resulting data file blocks on a random-accessible recording medium and for reproducing the recorded data file. The recording/reproducing device 60A divides the speech data file into plural data file blocks for recording the blocks on a random-accessible recording medium and for reproducing the recorded data file.

Referring to FIG. 15, an editing device 50 is connected to the data recording/reproducing device 40 and generates an input/output control signal for controlling the data recording/reproducing device 40. The data recording/reproducing device 40 records plural speech data and/or video data (speech/video data) and furnishes the speech/video data as an editing object to the editing device 50 responsive to requests from the editing device 50. The data recording/reproducing device 40 receives editing data from the editing device 50 and generates the speech/video data of the same contents as the editing result data based on the editing data. The editing data indicates which portion of the data materials is being used in the speech/video data obtained as a result of editing (editing result data).

Referring to the internal structure of the data recording/reproducing device 40, there are connected to a bus line 46 a micro-processing unit (CPU) 41, a read-only memory (ROM) 42, having stored therein the program for the CPU, a random access memory (RAM) 43 as a working area in which the CPU executes the program, a control signal interfacing circuit (control I/F circuit) 44 and a file management information storage unit 45, such as a hard disc, for storage of the file management information as later explained. The control I/F circuit 44 captures the input/output signal from the editing device 50 to send the resulting signal to the CPU. The above components make up a control computer. The constituent portions of the data recording/reproducing device 40 are controlled, while the recording area of each of the speech data and the video data recorded in the data storage devices 60A and 60V is managed based on the editing data entered from the editing device 50. That is, the CPU (microprocessor unit) 41 is constituted by, for example, a general-purpose micro-processor or a reduced instruction set computer (RISC) micro-processor and its peripheral circuit. The CPU 41 executes a program stored in the ROM 42, using the RAM 43, and exchanges editing data and the response data to and from the editing device 50 via the control I/F circuit 44.

The video data storage device 60V and the speech data storage device 60A are each a large-capacity random-accessible data recording/reproducing means, such as a hard disc array device. The video data storage device 60V performs data input/output with an interfacing circuit (video data storage I/F circuit) 61V, such as SCSI, connected to the bus line 46. The audio data storage device 60A performs data input/output with an interfacing circuit (audio data storage I/F circuit) 61A, connected to the bus line 46. The video data storage I/F circuit 61V and the audio data storage I/F circuit 61A perform data input/output with a video buffer memory 62V and an audio buffer memory 62A connected to the bus line 46, respectively. The video buffer memory 62V performs data input/output with a video signal encoder/decoder 63V, while the audio buffer memory 62A performs data input/output with an audio signal encoder/decoder 63A. The video buffer memory 62V and the audio buffer memory 62A perform data buffering between the video or speech signals as continuous constant-speed data on one hand and video signals of the high-speed intermittent video data storage device 60V and speech data of the speech data storage means 60A. The encoder/decoder 63V for video signals and the encoder/decoder 63A for audio signals performs data compression/expansion as the occasion may demand and performs input/output of the speech/video signals with an external terminal 65 via an interfacing circuit for speech/video signals (speech video signal I/F circuit) 64.

The CPU 41 of the data recording device 40 controls the video data storage device 60V and the speech data storage device 60A via video/speech data storage I/F circuit 60V and 61A in synchronism with synchronization signals, such as reference signals of a broadcasting station, and manages control for storing video data in the data storage device 60V and in the speech data storage device 60A responsive to the request from the external equipment, such as the editing device 50, while furnishing the recorded speech/video data to an external equipment, such as the editing device 50. The CPU 41 generates recording area data or the file management information specifying a recording area taken up by each of the video data recorded in the data storage device 60V and the speech data recorded on the data storage device 60A on the recording medium (hard disc or the like) of each of the data storage device 60V and 60A. In addition, the CPU 11 generates recording area data or the file management information for partial data (the portions of the speech/video data or data materials contained in the editing result data), that is data specifying the recording area taken up by the partial data on the recording medium of each of the data storage devices 60V and 60A. In addition, the CPU 41 manages control for storing recording area data or the file management information thus generated in the RAM 43 and in the file management information storage unit 45, such as a hard disc.

An illustrative example of management of recording data of the data storage devices 60V and 60A employing the file management information or the recording area data is hereinafter explained.

FIG. 16 shows an example of the file management information or the recording area data. The file management information, write/readout controlled by the CPU 41 with respect to the RAM 43 or the file management information storage unit 45, is formulated as a list (record entry) of the type of the so-called linked list.

In the file management information, shown in FIGS. 16(A) to 16(E), (A) denoted a 'file entry' having a 'file name' indicating the name of a file and 'a first record entry link' specifying the record entry number associated with the data to be recorded/reproduced first in the file. The record means a group of data continuously recorded on the recording mediums of the data storage devices 60V and 60A. The video record of the video data and the speech record of the speech data are managed independently of each other. In FIG. 16, (A) denotes a 'file entry' having a 'first record entry link' specifying the video record entry number associated with the video data of the file to be first recorded/reproduced and four 'first speech record entry links' specifying the first speech record entry numbers of the speech data for four channels. FIG. 16(B) denotes a 'video record entry' having a 'next video record entry link' specifying the video record entry number associated with the video data to be next recorded/reproduced, a 'leading position data' specifying the leading address of data continuously recorded on the medium of the video data storage device 60V, that is a video record, a 'recording length data' specifying the video data size of the video record, and a 'control flag' including the information indication whether or not the data of the record may be deleted. If the link data of the 'next record entry link' is an END data, there is no next record entry. It is the last portion of the video data that is recorded in the recording area specified by the record entry. The 'control flag' specifies, as a deletion possibility indicating flag, that associated data can or cannot be deleted if the flag is ON or OFF, respectively. It can also specify MUTE, that is that reproduction is not performed. In FIG. 16, (C) denotes a 'speech record entry' having a 'next speech record entry link' specifying the speech record entry number associated with the speech data to be next recorded/reproduced in the file, a 'leading position data' specifying the leading address of data continuously recorded on the medium of the speech data storage device 60A, that is a speech record, a 'recording length data' specifying the speech data size of the speech record, and a 'control flag' including the information indication whether or not the data of the record may be deleted. In FIG. 16, (D) denotes a 'free space list for video' specifying the vacant area on the recording medium of the video data storage device 60V, and has a 'next free space link for video' specifying the free space number associated with the next vacant area, a 'leading position data' specifying the leading address of the free space for video and a 'recording length data' specifying the size of the free space for video. In FIG. 16, (E) denotes a 'free space list for audio' specifying the vacant area on the recording medium of the speech data storage device 60A, and has a 'next free space link for audio' specifying the free space number associated with the next vacant area, a 'leading position data' specifying the leading address of the free space for audio and a 'recording length data' specifying the size of the free space for audio. The address of the free space or the size of the recording length data may be represented in terms of blocks as units.

The 'control' flag of each record entry for video and for speech is turned OFF, signifying deletion being not possible, for a virtual data file in case of performing non-destructive editing. If the non-destructive editing is again explained, the editing result data obtained as a result of editing using the speech/video data file as plural editing data materials is not newly recorded on a recording medium, but partial data of each of the recording mediums of the random-accessible data storage devices 60V, 60A are sequentially reproduced on the real-time basis in accordance with the list specifying the start and end positions of the partial data representing the contents of the editing result data of the original plural speech/video data files, thus producing the speech/video data of the above-mentioned editing result data. The virtual data file means a speech/video data representing the editing results made up of the lists of the partial data.

Figure 17:
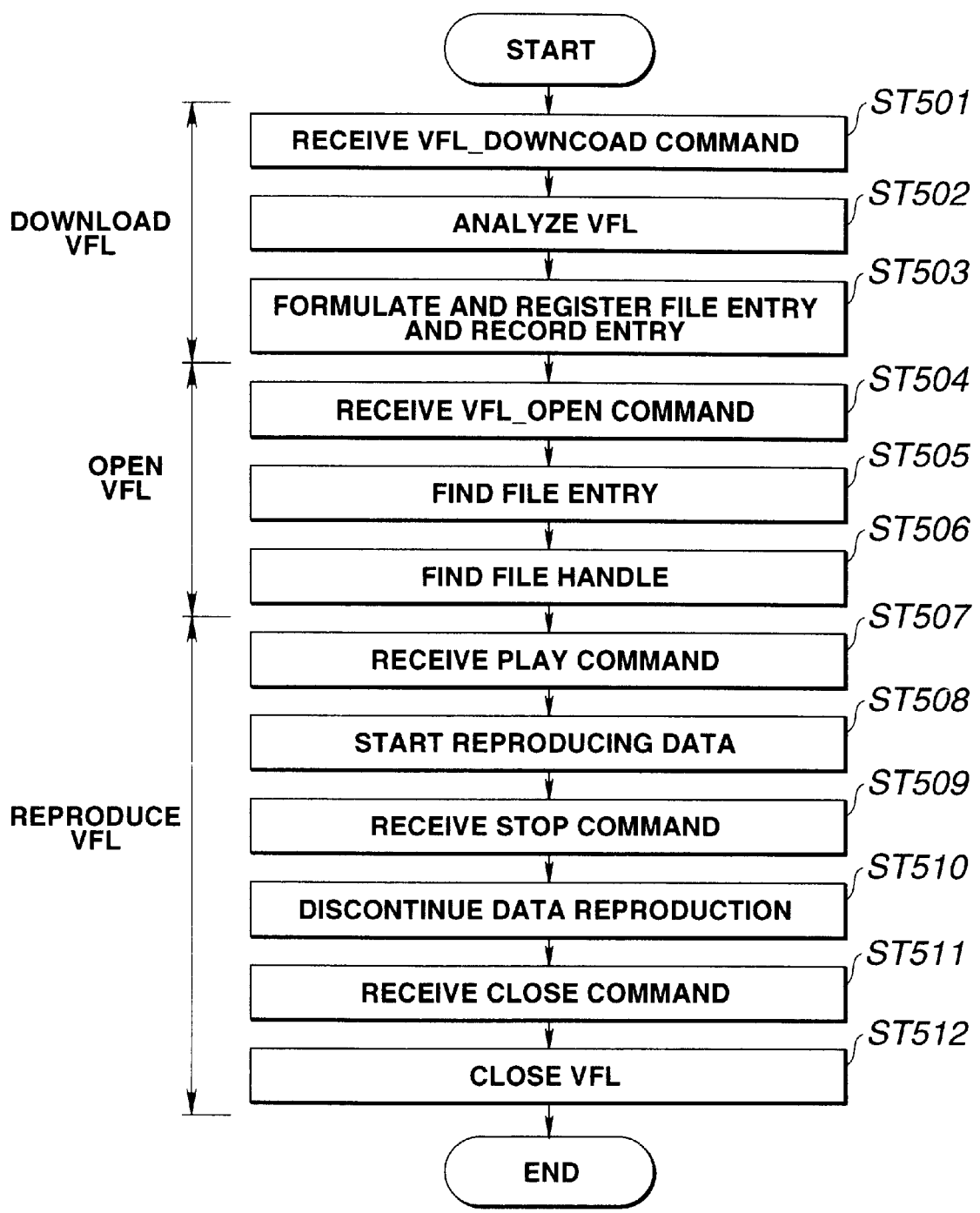
FIG. 17 is a flowchart for illustrating the processing for reproducing video/speech data employing the editing data for formulating the virtual data file.

FIG. 17 shows, in a flowchart, the processing for reproducing the speech data and the video data based on the editing data (video file list (VFL)) designed for formulating the above-mentioned virtual data file.

In FIG. 17, the editing device 50 outputs at step ST501 a command (VFL-DOWNLOAD command) to the data recording/reproducing device 40. The VFL-DOWNLOAD command is a command for causing the editing data including editing data VFL to be received by the data recording/reproducing device 40. The data recording/reproducing device 40 receives this VFL-DOWNLOAD command.

At step ST502 and step ST503, the data recording/reproducing device 40 analyzes the received editing data VFL and the record entry of each of the video data and the speech data and generates the playback entry of the editing result data and its file entry for storage in the RAM 43 and in the file management information storage unit 45.

At step ST504, the editing device 50 outputs to the data recording/reproducing device 40 a command (VFL-OPEN command) of combining the partial data based on the playback entry for making ready for the reproduction of the speech/video data of the same contents as those of the editing result data. The data recording/reproducing device 40 receives this VFL-OPEN command.

At step ST505, the CPU 41 of the data recording/reproducing device 40 retrieves the playback entry of the editing result data stored in the RAM 43 and in the file management information storage unit 45.

At step ST506, the CPU 41 of the data recording/reproducing device 40 generates a file handle.

At step ST507, the editing device 50 outputs the PLAY command to the data recording/reproducing device 40. The data recording/reproducing device 40 receives this PLAY command.

At step ST508, the CPU 41 of the data recording/reproducing device 40 controls the data storage devices 60V, 60A for reproducing the partial data from the data storage device 60V, 60A based on the playback entry.

At step ST509, the editing device 20 outputs the above-mentioned STOP command to the data recording/reproducing device 40. The data recording/reproducing device 40 receives this STOP command.

At step ST510, the CPU 41 of the data recording/reproducing device 40 controls the data storage devices 60V, 60A for discontinuing the reproduction of the partial data.

At step ST511, the editing device 50 outputs the above-mentioned CLOSE command to the data recording/reproducing device 40. The data recording/reproducing device 40 receives this CLOSE command.

At step ST512, the CPU 41 of the data recording/reproducing device 40 closes the file of the editing data VFL.

The processing by the CPU 41 of the data recording/reproducing device 40 for generating the playback entry from the editing data is similar to the processing shown in the flowchart of FIG. 12. However, it is necessary to perform processing for data of the speech data channel and the video data channel. This will be explained later by referring to FIGS. 32 and 33.

FIGS. 18(A) and (B) show recording examples of the video and speech data when employing the file management information shown n FIG. 16. FIGS. 19(A) to (C) show the corresponding file management information. FIGS. 18(A) and (B) and in FIGS. 19(A) to (C) show illustrative examples of the recording areas of the recording mediums of the video data storage device 60V and the speech data storage device 60A occupied by the video data and the speech data of two files "A" and "B" and the file management information.

FIG. 18(A) shows an illustrative example of recording data on the recording medium for video of the video data storage device 60V. For example, video data of two files "A" and "B" are recorded. The video data of the file A are recorded in the 170th to 229th blocks from the leading end of the recording medium. The picture data of the file "B" is recorded in the 80th to 129th blocks and in the 230th to 329th blocks as from the leading end of the recording medium, with the remaining recording area being a vacant recording area.

FIG.18(B) shows an illustrative example of recording data on the recording medium for speech of the storage device for speech data 60A. For example, speech data of two files "A" and "B" are recorded. There are four speech channels A1, A2, A3 and A4 in the file "A". The speech data A1 are recorded in the 180th to blocks, the speech data A2 are recorded in the 200th to 219th blocks, the speech data A3 are recorded in the 220th to 239th blocks and the speech data A4 are recorded in the 240th to 259th blocks. There are two channels of the speech data B1 and B2 in the file B. The speech data B1 are recorded in the 40th to 69th blocks, while the speech data B2 are recorded in the 70th to 99th blocks, as from the leading end of the recording medium, with the remaining recording area being a vacant recording area.

Since there are occasions wherein a sole speech/video data are divisionally recorded in plural recording areas, the CPU 41 formulates the file management information of each of speech data and video data of the files "A" and "B" as lists of the form of the linked lusts (record entries) shown in FIGS. 19(A) and 19(B). The CPU 41 generates the vacant recording area data specifying the vacant recording area (free space) of each of the data storage devices 60V and 60A as lists of the form of the linked lusts (free space lists) shown in FIG. 19(C). If the link data of the 'next record entry link' of the record entry is of the end value (END), there is no next record entry nor free space. It is the last portion of the speech./video data that is recorded in the recording area specified by the record entry. This applies for a case in which the link data of the 'next free space link' of the free space list is of the end value (END). The control flags of the record entries of FIGS. 19(A) and 19(B) are all ON, although not shown.

The operation of the above-described data recording/reproducing device is explained mainly with respect to the playback operation for the record entry and playback entry.

First, the operation when the data recording/reproducing device 40 records the speech signal and the video signal entered from outside on the data storage devices 60V and 60A is explained with reference to recording of the speech signal and the video signal of the file "A" shown in FIG. 18(A).

Figure 20:
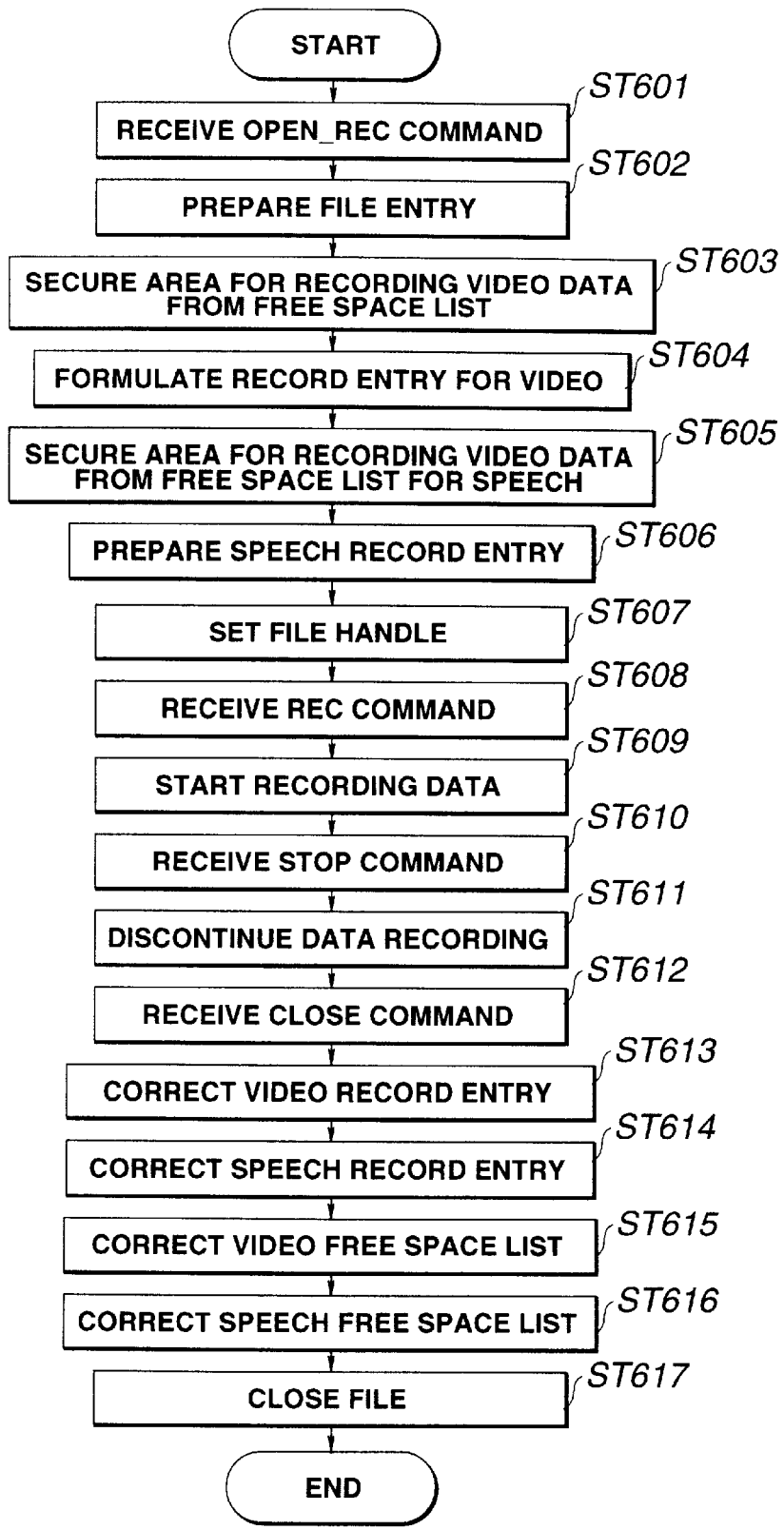
FIG. 20 is a flowchart illustrating the processing for recording video/speech data entering the data recording/ reproducing device embodying the present invention from outside.
Figure 21:
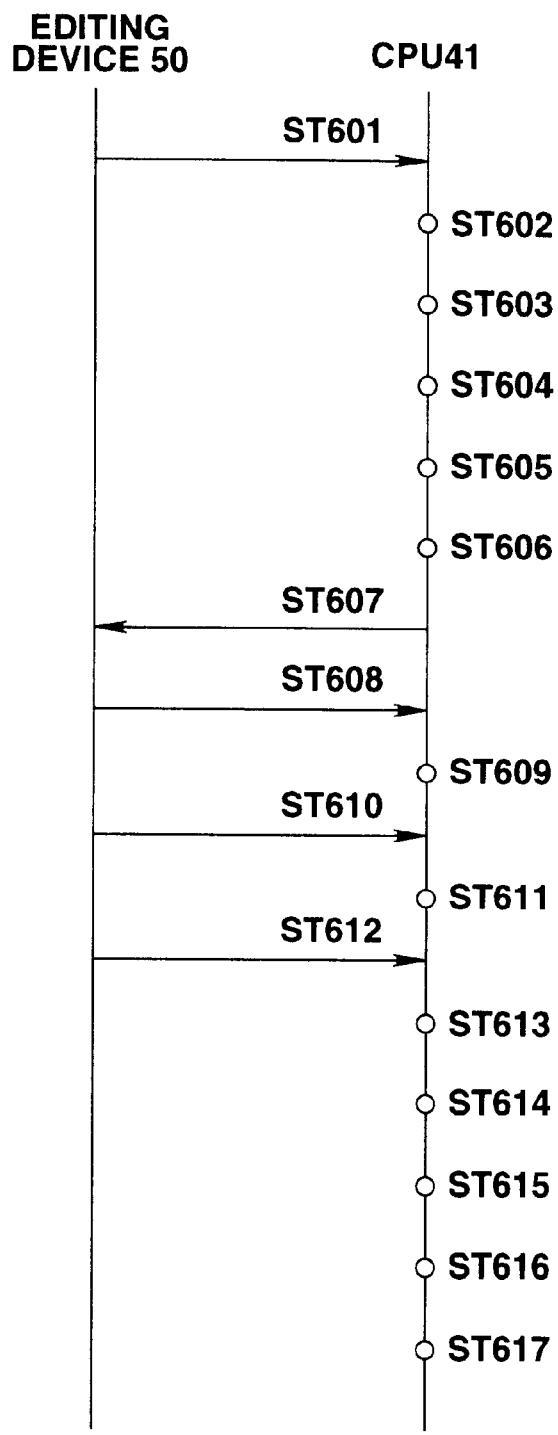
FIG. 21 shows a sequence of transmission/reception of control signals between the data recording/reproducing device embodying the present invention and an external editing device in case of recording video/speech data entering the recording/reproducing device from outside.

FIG. 20 shows, in a flowchart, the processing by the CPU 41 of the data recording/reproducing device 40 for recording video data and speech data entered from outside on the data storage device 60V and on the speech storage device 60A, while FIG. 21 is a sequence chart for control signals between the editing device 50 and the data recording/reproducing device 40 when recording speech/video data entered from outside on the data storage devices 60V and 60A.

Referring to FIGS. 20 and 21, the editing device 50 outputs at step ST601 to the CPU 41 of the data recording/reproducing device 40 a command including pre-set data, such as file name (A) and a data length (60 blocks) and which commands the CPU 41 of the data recording/reproducing device 40 to formulate a record entry for the speech/video data (OPEN-REC command). The CPU 41 receives this OPEN-REC command.

At step ST602, the CPU 41 of the data recording/reproducing device 40 generates the file entry for storage in the RAM 43 and in the file information storage unit 45.

At step ST603, the CPU 41 of the data recording/reproducing device 40 analyzes the space list stored in the RAM 43 or in the file information storage unit 45 and secures an area for recording.

At step ST604, the CPU 41 of the data recording/reproducing device 40 generates a record entry (FIG. 9(B) and FIG. 11(A)) based on data such as file name included in the OPEN-REC command for recording in the RAM 43 or in the file information storage unit 45.

At step ST605, the CPU 41 of the data recording/reproducing device 40 analyzes the free space list for speech stored in the RAM 43 or in the file information storage unit 45 and secures an area for speech data recording.

At step ST606, the CPU 41 of the data recording/reproducing device 40 generates the speech record entry (FIG. 9(C) and FIG. 11(A)), based on data stored in the OPEN-REC command, such as file name, for recording in the RAM 43 or in the file information storage unit 45.

At step ST607, the CPU 41 of the data recording/reproducing device 40 sets a file handle (FIG. 2(A)) for the editing device 50 to access the opened file to send the set file handle to the editing device 50.

At step ST608, the editing device 50 outputs a command of starting the recording of the speech data and the video data of the file A (REC command) to the data recording/reproducing device 40. The CPU 41 of the data recording/reproducing device 40 receives this REC command.

At step ST609, the CPU 41 of the data recording/reproducing device 40 receiving the REC command manages control for recording the video data entered from the external equipment on the data storage device 60V in the order in which the data is stated in the record entry and for recording the speech data entered from the external equipment on the data storage devices 60A in the order in which the data is stated in the record entry.

At step ST610, the editing device 50 outputs to the data recording/reproducing device 40 a command of terminating recording of the speech data and the video data of the file A. The data recording/reproducing device 40 receives this STOP command.

At step ST611, the CPU 41 of the data recording/reproducing device 40 receiving the STOP command manages control to terminate the recording of the speech data and the video data of the file A in the data storage devices 60V and 60A.

At step ST612, the editing device 50 outputs to the data recording/reproducing device 40 a command of correcting (updating) the record entry and the free space list. The CPU 41 of the data recording/reproducing device 40 receives this STOP command.

At step ST613, the size of the recorded video data is recorded in an item of the recording length data of the video record entry to close the file.

At step ST614, the size of the recorded speech data is recorded in an item of the recording length data of the speech record entry to close the file.

At step ST615, the area on the recording medium of the video data storage device 60V secured for recording without being used is opened and added to the free space list for video.

At step ST616, the area on the recording medium of the speech data storage device 60A secured for recording without being used is opened and added to the free space list for speech.

At step ST617, the recording file is closed.

The operation of the data recording/reproducing device 40 in reproducing the speech/video signals recorded in the data storage devices 60V and 60A is hereinafter explained.

Figure 22:
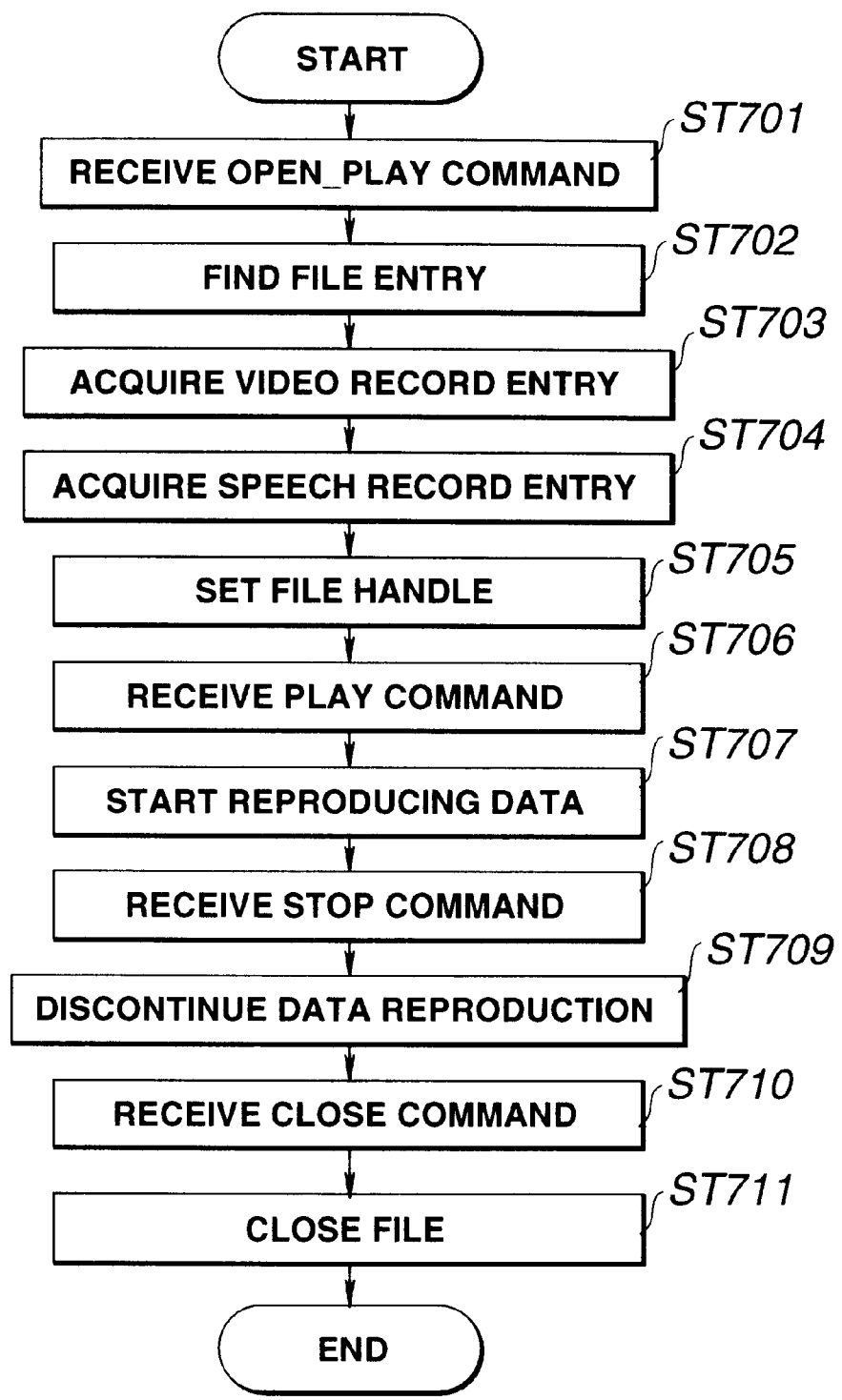
FIG. 22 is a flowchart illustrating the processing for reproducing video/speech data recorded in the data recording/reproducing device embodying the present invention.
Figure 23:
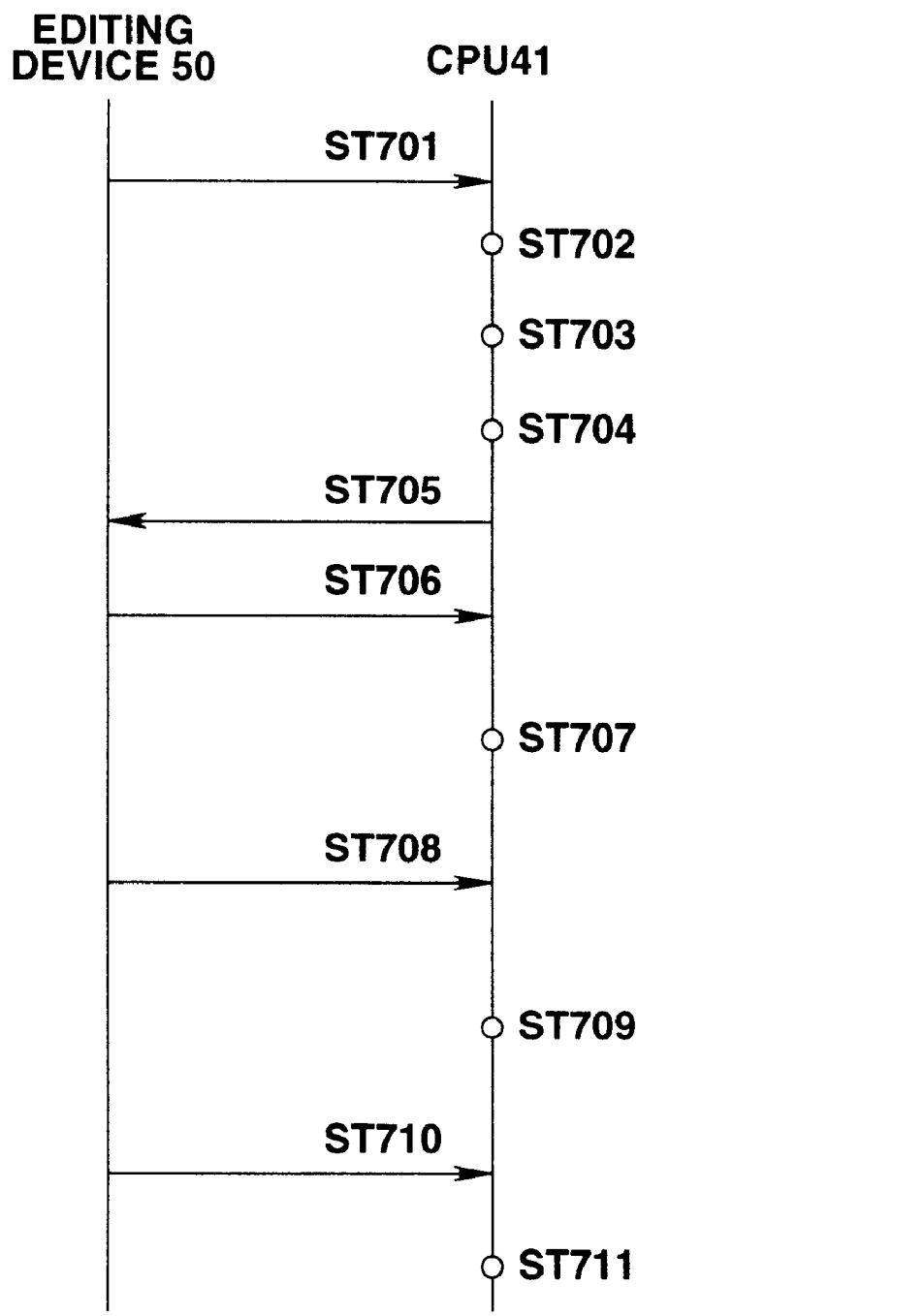
FIG. 23 shows a sequence of transmission/reception of control signals between the data recording/reproducing device embodying the present invention and an external editing device in case of reproducing video/speech data in the data recording/reproducing apparatus.

FIG. 22 is a flowchart illustrating the processing when the CPU 41 of the data recording/reproducing device 40 shown in FIG. 15 reproduces the speech/video data. FIG. 23 is a sequence chart of control signals exchanged between the editing device 50 and the CPU 41 of the data recording/reproducing device 40 shown in FIG. 1 when the data recording/reproducing device 40 reproduces the speech/video data recorded on the data storage devices 60V and 60A.

At the first step ST701, in FIGS. 22 and 23, the editing device 50 outputs to the data recording/reproducing device 40 a command (OPEN-PLAY command) of making ready for reproduction of speech/video data, inclusive of the data such as file name (A). The CPU 41 of the data recording/reproducing device 40 receives this OPEN-PLAY command.

At step ST702, the CPU 41 of the data recording/reproducing device 40 retrieves the file name of optional data of the OPEN-PLAY command from the file name item of the file entry stored in the RAM 43 and in the file management information storage unit 45 and acquires the record entry of the video data and the speech data of the file "A" based on the retrieved results.

At step ST703, the contents of the video record entry are sequentially acquired from the first video record entry item of the video data of the retrieved file entry.

At step ST704, the contents of the speech record entry are sequentially acquired from the first speech record entry item of the speech data of the retrieved file entry.

At step ST705, the data recording/reproducing device 40 sets a file handle for the editing device 50 to access the opened file and sends the file handle thus set to the editing device 50.

At step ST706, the editing device 50 outputs to the data recording/reproducing device 40 a command for starting reproduction of the speech/video data A (PLAY command). The CPU 41 of the data recording/reproducing device 40 receives this PLAY command.

At step ST707, the CPU 41 of the data recording/reproducing device 40 takes out the speech data and the video data of the file "A" recorded in the data storage device 30 from the area stated in the record entry and sequentially reproduces the speech and video data to output the reproduced data to the editing device 50.

At step ST708, the editing device 50 outputs to the data recording/reproducing device 40 a command for discontinuing reproduction of the speech data and the video data of the file "A" (STOP command). The data recording/reproducing device 40 receives this STOP command.

At step ST709, the data recording/reproducing device 40 controls the data storage devices 60V and 60A to discontinue reproduction of the speech data and the video data.

At step ST710, the editing device 50 outputs to the data recording/reproducing device 40 a command for closing the playback file "A" (CLOSE command). The data recording/reproducing device 40 receives this CLOSE command.

At step ST711, the editing device 50 closes the file of the speech data and the video data of the file "A" so far reproduced.

FIG. 24 shows an example of a list of the above virtual data file (VFL). For the present virtual data file, the video output is of a 1 channel, while the speech output is of four channels.

In FIG. 24, [VIDEO], [AUDIO 1], [AUDIO 2], [AUDIO 3], [AUDIO 4] are key-words representing respective output channels. These key-words are followed by the file name, playback start position and the playback end position. The file name is followed by ".V" denoting only the video data of the file. The file name of the speech channel is followed by ".ch" assuming the value of ne of ".1", ".2", ".3" and ".4" representing the speech channel of the associated file. For example, in a virtual data file:

[AUDIO 1]

FILE_X.3 00:00:00:00 00:00:00:10, three speech channels of "FILE_X" are reproduced for an output of a speech channel.

FIGS. 25(A) and 25(B) show recording examples of the video and speech data when employing the above-mentioned file management information. FIGS. 26(A) to (D) show the corresponding file management information. FIGS. 25(A) and 25(B) and FIGS. 26(A) to (D) represent specified examples of the file management information and the recording areas occupied by the respective video data and speech data for each of two files "File_1" and "File_2 on each recording medium of each of the video and speech data storage devices 60V and 60A shown in FIG. 15.

FIG. 25(A) shows a specified example of recording data on the recording medium for video of the video data storage device 60V. The file name is followed by ".v" specifying video data of the file. The video data of the file "File_1" is recorded in the 100th to 199th blocks as from the leading end of the recording medium, while the video data of the file "File_2" is recorded in the 250th to 369th blocks as from the leading end of the recording medium. The remaining recording area is a vacant area.

FIG. 25(B) shows a specified example of recording data on the recording medium for speech of the speech data storage device 60A. For example, the speech data of the four channels "File_1", "File_2", "File_3" and "File_4 are recorded. There are two channels of speech data of the file "File_1". If these speech data files are denoted as "File_1.1", "File_1.2", the speech data "File_1.1" is recorded in the 100th to 199th blocks as from the leading end of the recording medium, while the speech data "File_1.2" is recorded in the 200th to 299th blocks as from the leading end of the recording medium. There are also two channels of audio data of the file "File_2". If these audio data files are denoted as "File_2.1", "File_2.2", the audio data "File_2.1" is recorded in the 400th to 519th blocks as from the leading end of the recording medium, while the video data "File_2.2" is recorded in the 520th to 639th blocks as from the leading end of the recording medium. The files "File_3", "File_4" are files made up only of speech data devoid of the video data, with the file "File_3" being made up of two channels of speech data files "File_3.3", "File_3.4", and with the "File_4" being made up of the one-channel of the speech data file "File_4.1". On the recording medium, the speech data "File_3.3" is recorded in the 700th to 849th blocks, while the speech data "File_3.4" is recorded in the 850th to 999th blocks. The speech data "File_4.1" is recorded in the 1100th to 1249th blocks. The remaining recording areas represent vacant areas.

The file management information of these files "File_1", "File_2", "File_3" and "File_4 (file entries and record entries) are formulated as lists (record entries) of the type of the linked lists as shown in FIGS. 26(A), 26(B), 26(C) and 26(D), respectively. Since these files are files actually recorded on the recording medium, the deletion possibility indicating flags appended to the record entries for specifying the deletion possibility of the records, more generically the control flags, are turned ON for indicating the deletion possibility.

The data volume for video per unit time differs from that for speech. However, for simplicity of the explanation, FIGS. 25(A) and (B) and FIGS. 26(A) to 26(D) show normalized video and speech data. Therefore, the recording length data of video and speech of the file "File_1" are both set to 100.

It is assumed that the video/speech data of these files "File_1", "File_2", "File_3" and "File_4 are used as data materials for editing for formulating the virtual data files which are editing result data as shown for example in FIG. 27.

In FIG. 27 is shown a time chart or a time table, in which time is plotted on the ordinate and the video signal [Video] and four channels of the speech signals [Audio1] to [Audio 4] are outputted with lapse of time.

FIG. 28 shows a specified example of a list for editing data for sequentially outputting the video and the four channels of the speech signals, that is the list of the virtual data file (VFL). The playback start position and the playback end position in the virtual data file are inherently stated by time codes. However, for simplicity of explanation, units (blocks) on the recording medium of FIG. 25 is used in place of the time code.

In FIG. 28, the file of the file name "MUTE" in the virtual data file is a keyword having a specified meaning. That is, it signified outputting a black picture and muting in the video channel and in the speech channel, respectively. Therefore, there is no data on the recording medium.

Figure 29:
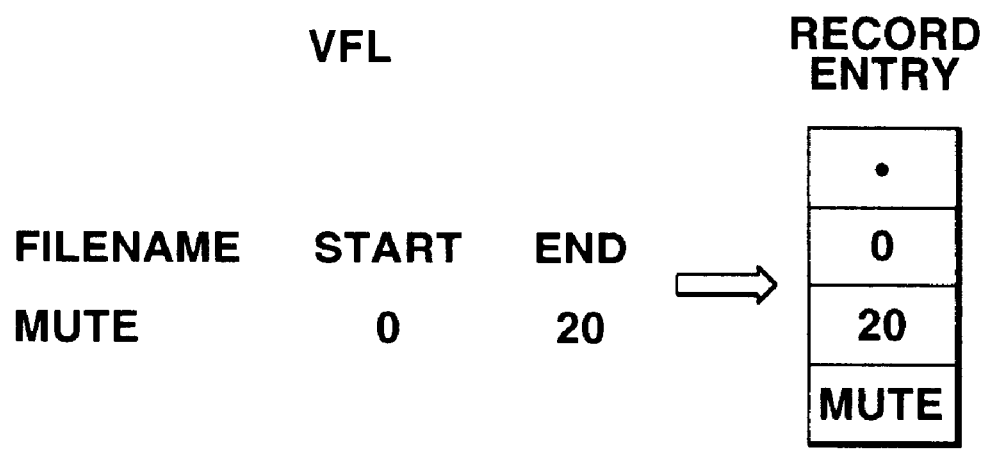
FIG. 29 illustrates the manner of handling a MUTE file for muting during reproduction.

FIG. 29 shows an example of the 'MUTE' file. A record entry is formulated for one 'MUTE'. In the deletion possibility indicating flag is stated "MUTE". In the recording length data is stated the time of 'MUTE' with blocks as units.

Figure 30:
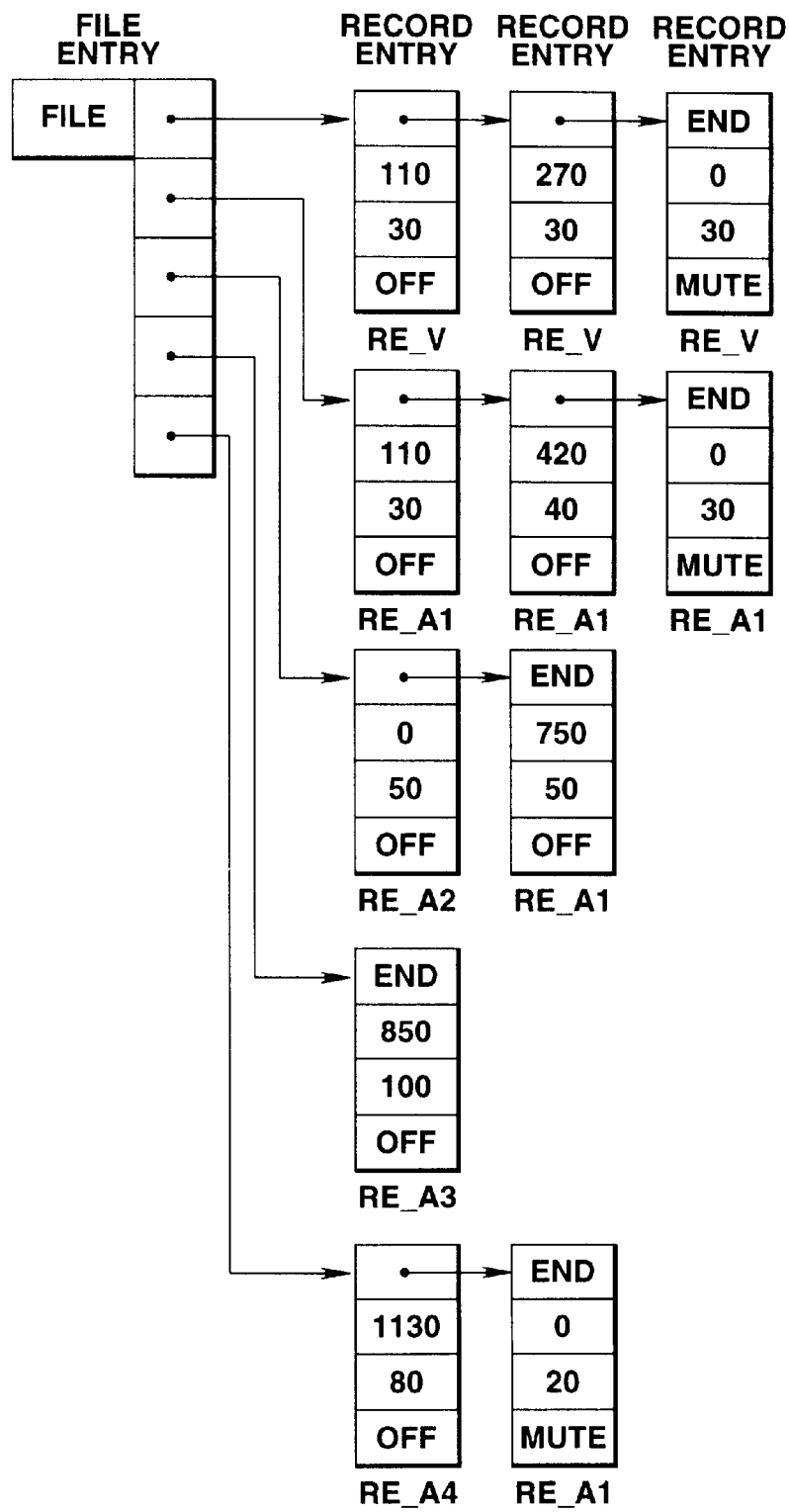
FIG. 30 illustrates a specified example of a file entry and a record entry as the file management information formulated from the virtual data file of FIG. 28.

FIG. 30 shows a file entry FE and record entries RE formulated from the virtual data file VFL shown in FIG. 27. The control flag of the record entry in the virtual data file is OFF for avoiding inadvertent erasure of the original recording data, since the record entry is virtual data. The control flag if the 'MUTE' file is MUTE.

FIG. 31(A) shows an example of file entry FE and record entries RE of the file "FILE(n)" of the instant embodiment. FIG. 31(A) shows an example of the file stated in the virtual data file and used in the explanation of the flowchart of FIGS. 32 and 33. Inherently, there is a record entry link for each video channel and each speech channel. For simplicity of explanation, such link is represented by a sole record entry link.

FIG. 31(B) shows an example of entry FE and record entries RE formulated from the virtual data file of the instant embodiment. FIG. 31(B) shows an example of the file stated in the virtual data file and used in the explanation of the flowcharts of FIGS. 2 and 33. Inherently, there is a record entry link for each video channel and each speech channel. For simplicity of explanation, such link is represented by a sole record entry link.

Figure 32:
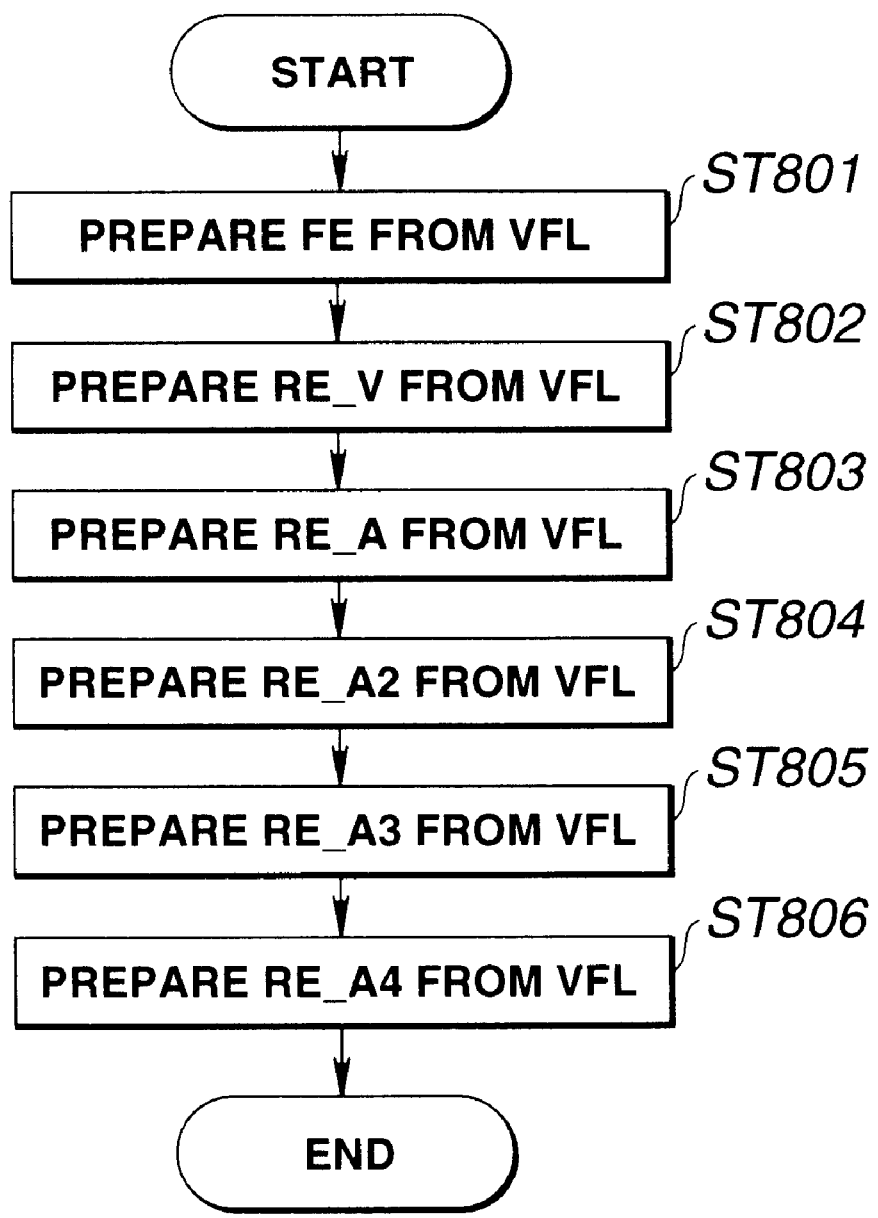
FIG. 32 is a flowchart for illustrating the analysis of the virtual data file and the formulation of the file management information according to the present invention.

FIG. 32 illustrates, by a flowchart, the analysis of the virtual data file VFL of the instant embodiment and preparation of the file entry FE and the record entry RE.

At the first step ST801 in FIG. 32, the file entry FE is prepared from the VFL of the virtual data file. In the subsequent steps ST802 to ST806, a record entry RE_V of video data, a record entry RE_A1 of a speech channel 1, a record entry RE_A2 of a speech channel 2, a record entry RE_A1 of a speech channel 3 and a record entry RE_A4 of a speech channel 4, are formed.

Figure 33:
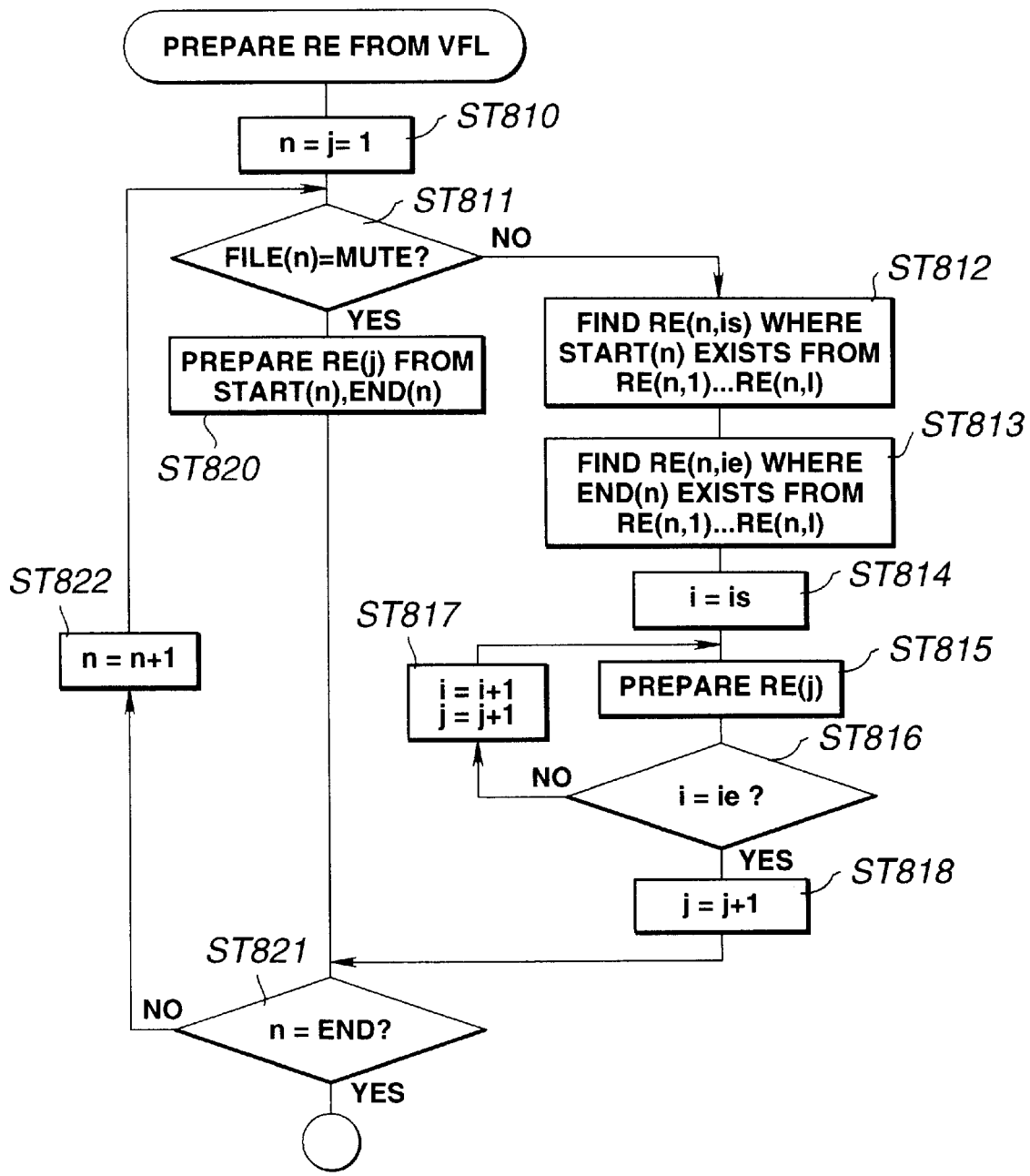
FIG. 33 is a flowchart for illustration the analysis of the virtual data file and formulation of the record entry in the flowchart of FIG. 32.

FIG. 33 shows an example of the algorithm for preparation of the record entry RE of video or speech data from the virtual data file VFL.

At step ST810 in FIG. 33, the values of the variables n and j are set to 1. The variable n is used for retrieving the file name data of the record entry of the data material (FIG. 31(A)), while the variable j is used for retrieving the partial data contained in the playback entry (FIG. 31(B)).

At the next step ST811, it is checked whether the file "FILE(n)" is a MUTE file. If the file is not the MUTE file, processing transfers to step ST812 and, if the file is the MUTE file, processing transfers to step ST820.

At step ST812, the record entry (RE(n), is) where the playback start position data (START(n)) exists is found by retrieving the record entries RE(n, 1) to RE(n, I) of the data material.

At step ST813, the record entry ((RE(n, ie) where the playback end position data (END(n)) exists is found by retrieving the record entries RE(n, 1) to RE(n, I) of the data material.

At step ST814, the variable i is set to is. The variable i is used for retrieving data included in the record entry.

At step ST815, the playback entry (RE(j)) of the editing result data X is generated.

At step ST816, it is checked whether or not the value of the variable i is ie. The value ie specifies the number of the playback entries (RE(j)). If the value of the variable i is not equal to ie, processing transfers to step ST817. If the value of the variable i is equal to ie, processing transfers to step ST818.

At step ST817, the variables i and j are incremented before processing reverts to step ST815.

At step ST818, the variable j is incremented before processing transfers to step ST821.

If the file "FILE(n)) is found at step ST811 to be a MUTE file, processing transfers to step ST820 to prepare the record entry RE(j) of the MUTE file from the playback start data (START(n)) and the playback end data (END(n)) before processing transfers to step ST821.

At step ST821, it is judged whether the value of the variable n is the value end. The value end denotes the number of the data materials. If the variable n is of the value end, processing comes to a close. If the variable n is not of the value end, processing transfers to step ST822.

With the data recording/reproducing apparatus for video/speech data, explained with reference to FIGS. 15 to 33, since the video data and the speech data are recorded in separate data storage devices 60V and 60A, and managed using the file management information for video and the file management information for speech, the number of channels of speech data can be varied at any time, while the speech data with different number of speech data channels may be allowed to co-exist. The data composed only of speech or data composed only of video can be handled, while video only or the optional speech channels only can be changed.

In addition, non-destructive editing can be carried out by the virtual data file. As for the virtual data file, the original data materials can be prevented from beings deleted by setting the deletion possibility information of the control flag to deletion not being possible, that is by turning the deletion possibility indicating flag OFF. In this manner, the number of channels of speech data in the virtual data file can be changed at any time, while speech data with the different number of channels can be allowed to co-exist in the virtual data file. Moreover, data made up only of speech or data made up only of video can be handled, while only the video or only optional speech channels can be changed in the virtual data file.

In addition, the video or the speech can be muted in the virtual data file by defining the MUTE with the control flag.

The present invention is not limited to the above-described embodiments. For example, the number of channels of speech signals may be 1, 2, 3 or 5 without being limited to 4.

What is claimed is:

1. A data recording apparatus comprising:

first recording means for recording a video data file as one or more video records, with the video record being a group of continuous data on a random-accessible recording medium;

second recording means for recording a speech data file as one or more speech records, with the speech record being a group of continuous data on a random-accessible recording medium; and management means for managing said video data file and said speech data file recorded as said one or more video records or as said one or more speech records on said recording medium, respectively, using a file entry, a video data record entry and a speech data record entry, said file entry having a file name common to said video data file and said speech data file, a video record entry number of the leading video record of said video data file and a speech record entry number of the leading speech record of said speech data file;

said video data record entry being provided for each video record of said video data file and having a video record entry number of the next video record presenting data continuity with respect to the current video record, leading position data specifying the leading position of the recording area of the video record, recording length data specifying the size of the recording area of the current video record and a first control flag specifying whether or not the current video record can be deleted;

said speech data record entry being provided for each speech record of said speech data file and having a speech record entry number of the next speech record presenting data continuity with respect to the current speech record, leading position data specifying the leading position of the recording area of the speech record, recording length data specifying the size of the recording area of the current speech record and a second control flag specifying whether or not the current speech record can be deleted.

2. The data recording apparatus s claimed in claim 1 further comprising first vacant area managing means for managing vacant areas for said video data files present scattered on said recording medium using link data specifying the link state to the next vacant area, leading position data specifying the leading position of said vacant area and area length data specifying the size of said vacant area; and second vacant area managing means for managing vacant areas for said speech data files present scattered on said recording medium using link data specifying the link state to the next vacant area, leading position data specifying the leading position of said vacant area and area length data specifying the size of said vacant area.

3. A data recording/reproducing apparatus comprising:

first recording/reproducing means for recording a video data file as one or more video records, with the video record being a group of continuous data on a random-accessible recording medium and for reproducing the recorded video data file;

second recording means for recording a speech data file as one or more speech records, with the speech record being a group of continuous data on a random-accessible recording medium and for recording the recorded speech data file; and management means for managing said video data file and said speech data file recorded as said one or more video records or as said one or more speech records on said recording medium, respectively, using a file entry, a video data record entry and a speech data record entry, said file entry having a file name common to said video data file and said speech data file, a video record entry number of the leading video record of said video data file and a speech record entry number of the leading speech record of said speech data file;

said video data record entry being provided for each video record of said video data file and having a video record entry number of the next video record presenting data continuity with respect to the current video record, leading position data specifying the leading position of the recording area of the video record, recording length data specifying the size of the recording area of the current video record and a first control flag specifying whether or not the current video record can be deleted;

said speech data record entry being provided for each speech record of said speech data file and having a speech record entry number of the next speech record presenting data continuity with respect to the current speech record, leading position data specifying the leading position of the recording area of the speech record, recording length data specifying the size of the recording area of the current speech record and a second control flag specifying whether or not the current speech record can be deleted.

4. The data recording/reproducing apparatus s claimed in claim 3 further comprising first vacant area managing means for managing vacant areas for said video data files present scattered on said recording medium using link data specifying the link state to the next vacant area, leading position data specifying the leading position of said vacant area and area length data specifying the size of said vacant area; and second vacant area managing means for managing vacant areas for said speech data files present scattered on said recording medium using link data specifying the link state to the next vacant area, leading position data specifying the leading position of said vacant area and area length data specifying the size of said vacant area.

5. The data recording/reproducing apparatus as claimed in claim 3 wherein said management means manages a virtual data file which, by designating portions of said video and/or speech data files, virtually becomes one video and/or speech data file.

6. The data recording/reproducing apparatus as claimed in claim 5 wherein said virtual data file has data specifying the file name of a designated video and/or speech data file, the playback start position and the playback end position in each of the designated video and/or speech data files.

7. The data recording/reproducing apparatus as claimed in claim 5 wherein said management means manages the file entry, video record entry and the speech record entry, as converted from said virtual data file.

8. The data recording/reproducing apparatus as claimed in claim 5 wherein the control flag for the video data file and said speech data file generated by recording on said recording medium can be deleted while the control flag for said virtual data file cannot be deleted.

9. A data recording/reproducing apparatus comprising:

first recording/reproducing means for recording a video data file as one or more video records, with the video record being a group of continuous data on a random-accessible recording medium and for reproducing the recorded video data file;

second recording means for recording a speech data file as one or more speech records, with the speech record being a group of continuous data on a random-accessible recording medium and for recording the recorded speech data file; and management means for managing said video data file and said speech data file recorded as said one or more video records or as said one or more speech records on said recording medium, respectively, using a file entry, a video data record entry and a speech data record entry;

said file entry having a file name common to said video data file and said speech data file, a video record entry number of the leading video record of said video data file and a speech record entry number of the leading speech record of said speech data file;

said video data record entry being provided for each video record of said video data file and having a video record entry number of the next video record presenting data continuity with respect to the current video record, leading position data specifying the leading position of the recording area of the video record, recording length data specifying the size of the recording area of the current video record and a first control flag specifying whether or not the current video record can be deleted;

said speech data record entry being provided for each speech record of said speech data file and having a speech record entry number of the next speech record presenting data continuity with respect to the current speech record, leading position data specifying the leading position of the recording area of the speech record, recording length data specifying the size of the recording area of the current speech record and a second control flag specifying whether or not the current speech record can be deleted;

wherein said management means manages a virtual data file which, by designating portions of said video and/or speech data files, virtually becomes one video and/or speech data file;

wherein said management means manages the file entry, video record entry and the speech record entry, as converted from said virtual data file; and wherein said virtual data file has virtual MUTE data for setting to zero the level of said video data file and said speech data file at the time of reproduction, and wherein, when said virtual data file is converted into said file entry, said video record entry and the speech record entry, the record entry corresponding to said file MUTE is formulated, data specifying the time of setting the playback level to zero is entered in an item of the recording length data of the record entry and data specifying MUTE is entered in the control flag of said record entry.

10. A data reproducing apparatus comprising:

first reproducing means for reproducing a video data file recorded as one or more video records on a random-accessible recording medium, with the video record being a group of continuous data on said random-accessible recording medium;

second reproducing means for reproducing a speech data file recorded as one or more speech records on a random-accessible recording medium, with the speech record being a group of continuous data on said random-accessible recording medium; and management means for managing said video data file and said speech data file recorded as said one or more video records or as said one or more speech records on said recording medium, respectively, using a file entry, a video data record entry and a speech data record entry, said file entry having a file name common to said video data file and said speech data file, a video record entry number of the leading video record of said video data file and a speech record entry number of the leading speech record of said speech data file;

said video data record entry being provided for each video record of said video data file and having a video record entry number of the next video record presenting data continuity with respect to the current video record, leading position data specifying the leading position of the recording area of the video record, recording length data specifying the size of the recording area of the current video record and a first control flag specifying whether or not the current video record can be deleted;

said speech data record entry being provided for each speech record of said speech data file and having a speech record entry number of the next speech record presenting data continuity with respect to the current speech record, leading position data specifying the leading position of the recording area of the speech record, recording length data specifying the size of the recording area of the current speech record and a second control flag specifying whether or not the current speech record can be deleted.

11. A data recording/reproducing method comprising:

recording a video data file as one or more video records, with the video record being a group of continuous data on a random-accessible recording medium, and reproducing the recorded video data file;

recording a speech data file as one or more speech records, with the speech record being a group of continuous data on a random-accessible recording medium, and reproducing the recorded speech data file; and managing said video data file and said speech data file recorded as said one or more video records or as said one or more speech records on said recording medium, respectively, using a file entry, a video data record entry and a speech data record entry, said file entry having a file name common to said video data file and said speech data file, a video record entry number of the leading video record of said video data file and a speech record entry number of the leading speech record of said speech data file;

said video data record entry being provided for each video record of said video data file and having a video record entry number of the next video record presenting data continuity with respect to the current video record, leading position data specifying the leading position of the recording area of the video record, recording length data specifying the size of the recording area of the current video record and a first control flag specifying whether or not the current video record can be deleted;

said speech data record entry being provided for each speech record of said speech data file and having a speech record entry number of the next speech record presenting data continuity with respect to the current speech record, leading position data specifying the leading position of the recording area of the speech record, recording length data specifying the size of the recording area of the current speech record and a second control flag specifying whether or not the current speech record can be deleted.

* * * * *